US012766507B2

(12) United States Patent
Hayashi et al.

(10) Patent No.: US 12,766,507 B2
(45) Date of Patent: Oct. 20, 2026

(54) SAMPLE MEASURING APPARATUS

(71) Applicant: SYSMEX CORPORATION, Kobe (JP)

(72) Inventors: Masato Hayashi, Kobe (JP); Shuhei Kaneko, Kobe (JP); Fumiaki Iwase, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 660 days.

(21) Appl. No.: 18/327,123

(22) Filed: Jun. 1, 2023

(65) Prior Publication Data

US 2023/0390766 A1 Dec. 7, 2023

(30) Foreign Application Priority Data

Jun. 6, 2022 (JP) ................................ 2022-091494
Jun. 6, 2022 (JP) ................................ 2022-091517

(51) Int. Cl.

*B01L 3/00* (2006.01)
*B01L 7/00* (2006.01)
*G01N 21/77* (2006.01)

(52) U.S. Cl.

CPC ........... *B01L 3/502715* (2013.01); *B01L 7/00* (2013.01); *G01N 21/77* (2013.01); *B01L 2200/04* (2013.01); *B01L 2200/16* (2013.01); *B01L 2300/0654* (2013.01); *B01L 2300/1894* (2013.01)

(58) Field of Classification Search

CPC .. B01L 3/502715; B01L 7/00; B01L 2200/04; B01L 2200/16; B01L 2300/0654; B01L 2300/1894; G01N 21/77; G01N 2035/00346; G01N 35/00
See application file for complete search history.

(56) References Cited

U.S. PATENT DOCUMENTS

2003/0070498 A1* 4/2003 Ohyama ............ G01N 35/1079 73/864.02
2004/0081583 A1 4/2004 Berndt et al.
2011/0223064 A1 9/2011 Katsumi et al.
(Continued)

FOREIGN PATENT DOCUMENTS

CN 107636470 1/2018
CN 108535503 A 9/2018
(Continued)

OTHER PUBLICATIONS

English Translation of CN212964990U (Year: 2026).*
(Continued)

*Primary Examiner* — Jennifer Wecker
(74) *Attorney, Agent, or Firm* — JCIPRNET

(57) ABSTRACT

A sample measuring apparatus according to one or more embodiments may include a measuring unit that measures a sample in a container, a power supply that supplies power to the measuring unit, and an apparatus housing that accommodates the measuring unit and the power supply inside. In one or more embodiments, the power supply may be arranged in an area in the apparatus housing, the area that is the power supply is arranged is different from an area that the measuring unit is arranged in a plan view, and the power supply is arranged at a higher position than a position that the measuring unit is arranged.

16 Claims, 23 Drawing Sheets

(56) References Cited

U.S. PATENT DOCUMENTS

| | | | |
|---|---|---|---|
| 2013/0036755 A1 | 2/2013 | Kang | |
| 2013/0132006 A1 | 5/2013 | Gwynn et al. | |
| 2018/0164336 A1 | 6/2018 | Niiyama et al. | |
| 2019/0383844 A1 | 12/2019 | Miyazaki et al. | |

FOREIGN PATENT DOCUMENTS

| | | | |
|---|---|---|---|
| CN | 210663444 | U | 6/2020 |
| CN | 212964990 | U | 4/2021 |
| JP | 2000-74801 | A | 3/2000 |
| JP | 2003-83979 | A | 3/2003 |
| JP | 2003075304 | | 3/2003 |
| JP | 2009-8611 | A | 1/2009 |
| JP | 2011-19117 | A | 1/2011 |
| JP | 2012112832 | | 6/2012 |
| JP | 2012-145449 | A | 8/2012 |
| JP | 2012-194072 | A | 10/2012 |
| JP | 2019219203 | | 12/2019 |
| JP | 2020193808 | | 12/2020 |
| WO | 2016203856 | | 12/2016 |
| WO | 2022049722 | | 3/2022 |
| WO | 2022/097346 | A1 | 5/2022 |

OTHER PUBLICATIONS

Extended European search report (EESR) issued on Oct. 6, 2023 in a counterpart European patent application.

Extended European search report (EESR) issued on Oct. 6, 2023 in a related European patent application.

"Office Action of China Counterpart Application", issued on Mar. 27, 2026, with English translation thereof, p. 1-p. 18.

"Notice of Reasons for Refusal of Japan Counterpart Application", issued on Apr. 1, 2026, with English translation thereof, p. 1-p. 6.

"Notice of Reasons for Refusal of Japan Counterpart Application", issued on Feb. 9, 2026, with English translation thereof, pp. 1-10.

"Office Action of U.S. Related Application, U.S. Appl. No. 18/327,142", issued on May 12, 2026, p. 1-p. 32.

* cited by examiner

A-A

SAMPLE MEASURING APPARATUS

CROSS REFERENCE TO RELATED APPLICATIONS

This application claims priority from prior Japanese Patent Applications No. 2022-091494, filed on Jun. 6, 2022, and No. 2022-091517, filed on Jun. 6, 2022, the entire contents of which are incorporated herein by reference.

TECHNICAL FIELD

The disclosure relates to a sample measuring apparatus.

BACKGROUND ART

A sample measuring apparatus that measures a sample is generally provided with a dispenser that dispenses a sample and a reagent into a container and a measuring unit that measures a sample in a container, etc.

The above mentioned sample measuring apparatus has a power supply that supplies power to a dispenser and a measuring unit. In Japanese Patent Publication No. 2003-83979 (Patent Document 1), a configuration that provides a partition plate, which divides an upper part where a reaction unit and a cooling unit in a housing are located and a lower part where a power supply unit in the housing is located, into an upper and lower parts in an analyzer is disclosed.

SUMMARY

However, since the above mentioned analyzer has a power supply unit that generates heat at a bottom, the heat from the power supply unit may be transferred to an upper partition plate after prolonged use, affecting a sample in a reaction unit through a partition plate. In case that heat affects the sample in the reaction unit, a sample temperature during measurement may become unstable, resulting in a decrease in measurement accuracy.

A sample measuring apparatus according to one or more embodiments may suppress heat generated in a power supply from affecting temperature of a sample in a measuring unit.

Such as is illustrated in FIG. 2 to FIG. 5, a sample measuring apparatus (1) according to one or more embodiments may be provided with a measuring unit (53) that measures a sample placed in a container (90), a power supply (56) that supplies power to the measuring unit (53), and an apparatus housing (10) that has the measuring unit (53) and the power supply (56) inside, and the power supply (56) is located in the apparatus housing (10) in an area different from the measuring unit (53) in a plan view and located at a higher position than the measuring unit (53).

According to the sample measuring apparatus (1) according to one or more embodiments, the power supply (56) is separated from the measuring unit (53), so that heat generated in the power supply (56) can be suppressed from affecting the temperature of a sample in the measuring unit (53).

According to one or more embodiments, it may be possible to provide a sample measuring apparatus that may suppress heat generated in the power supply from affecting the temperature of a sample in the measuring unit.

DETAILED DESCRIPTION

The following is a detailed description of a sample measuring apparatus according to one or more embodiments, with reference to the drawings.

Sample Measuring Apparatus

Figure 1:
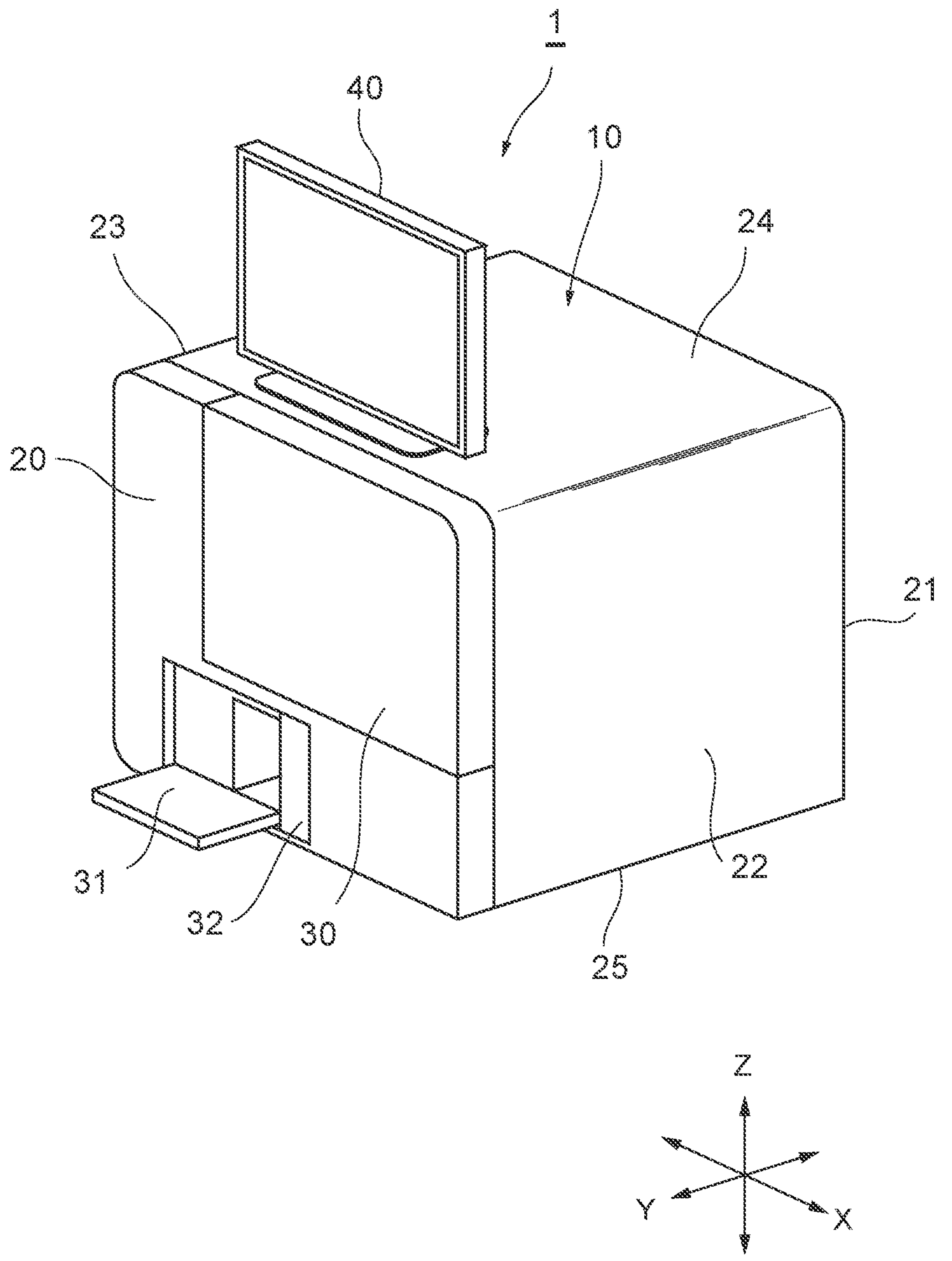
FIG. 1 is a perspective view illustrating an appearance of a sample measuring apparatus.

FIG. 1 is a perspective view illustrating an appearance of a sample measuring apparatus 1. The sample measuring apparatus 1 is used, for example, for a blood coagulation measurement to analyze an activity of a coagulation factor in a sample (blood sample).

The sample measuring apparatus 1 has an apparatus housing 10 with a substantially rectangular shape. The apparatus housing 10 has a front surface 20, a rear surface 21, a right side surface 22, a left side surface 23, a top surface 24, and a bottom surface 25. In this specification, "left" and "right" of the sample measuring apparatus 1 are based on a direction in case that the front surface 20 is viewed from the front.

The front surface 20 is provided with a cover 30 that can be opened and closed freely, and by opening the cover 30, a user can access an interior of the apparatus housing 10. The front surface 20 is provided with a door 31 for access to the interior of a reagent container storage 52, which is described below, and a door 32 for access to the interior of a sample rack storage 50.

The top surface 24 is a square flat surface, and a monitor 40 can be installed on it. The monitor 40 is a touch panel display, can be used for an input for an operation necessary for a sample measurement, and can display various information and display information on a result of a sample measurement. Other PCs, etc. may be placed on the top surface 24.

Figure 2:
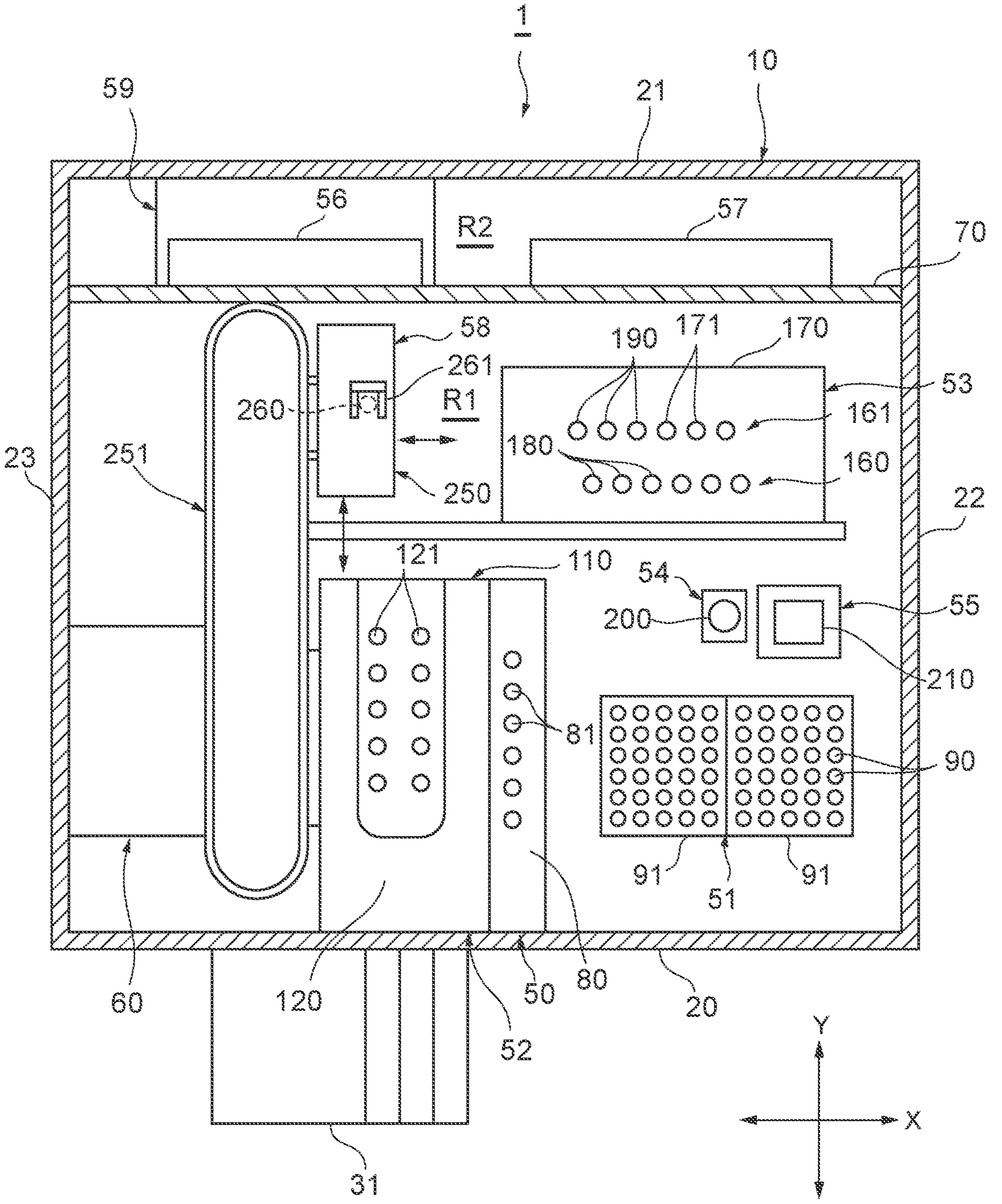
FIG. 2 is a plan view illustrating an internal structure of the sample measuring apparatus.

FIG. 2 is a plan view illustrating an internal structure of the sample measuring apparatus 1. The sample measuring apparatus 1 is provided with a sample rack storage 50, a reaction container storage 51, a reagent container storage 52, a measuring unit 53, a cleaner 54, a disposal section 55, a power supply 56, a controller 57, a dispenser 58, a first heat exhaust section 59, and a second heat exhaust section in the apparatus housing 10.

The apparatus housing 10 has a vertical plate 70 inside it as a partition member that is located on a rear surface 21 side (near the rear surface 21) rather than a center of a front/rear direction Y. The vertical plate 70 has a square plate shape with a plate surface directed in the front/rear direction Y. The vertical plate 70 is formed from the right side surface 22 to the left side surface 23 of the apparatus housing 10. The vertical plate 70 isolates the interior of the apparatus housing 10 into a rear region R2 with a substantially square shape, which is formed near the rear surface 21 in a plan view, and a main region R1, which is other than the rear region R2. A planar area of the rear region R2 may be, for example, one-third of the planar area of the main region R1 or less. Also, the vertical plate 70 may completely block ventilation between the main region R1 and the rear region R2, or may not completely block ventilation between the main region R1 and the rear region R2.

Figure 3:
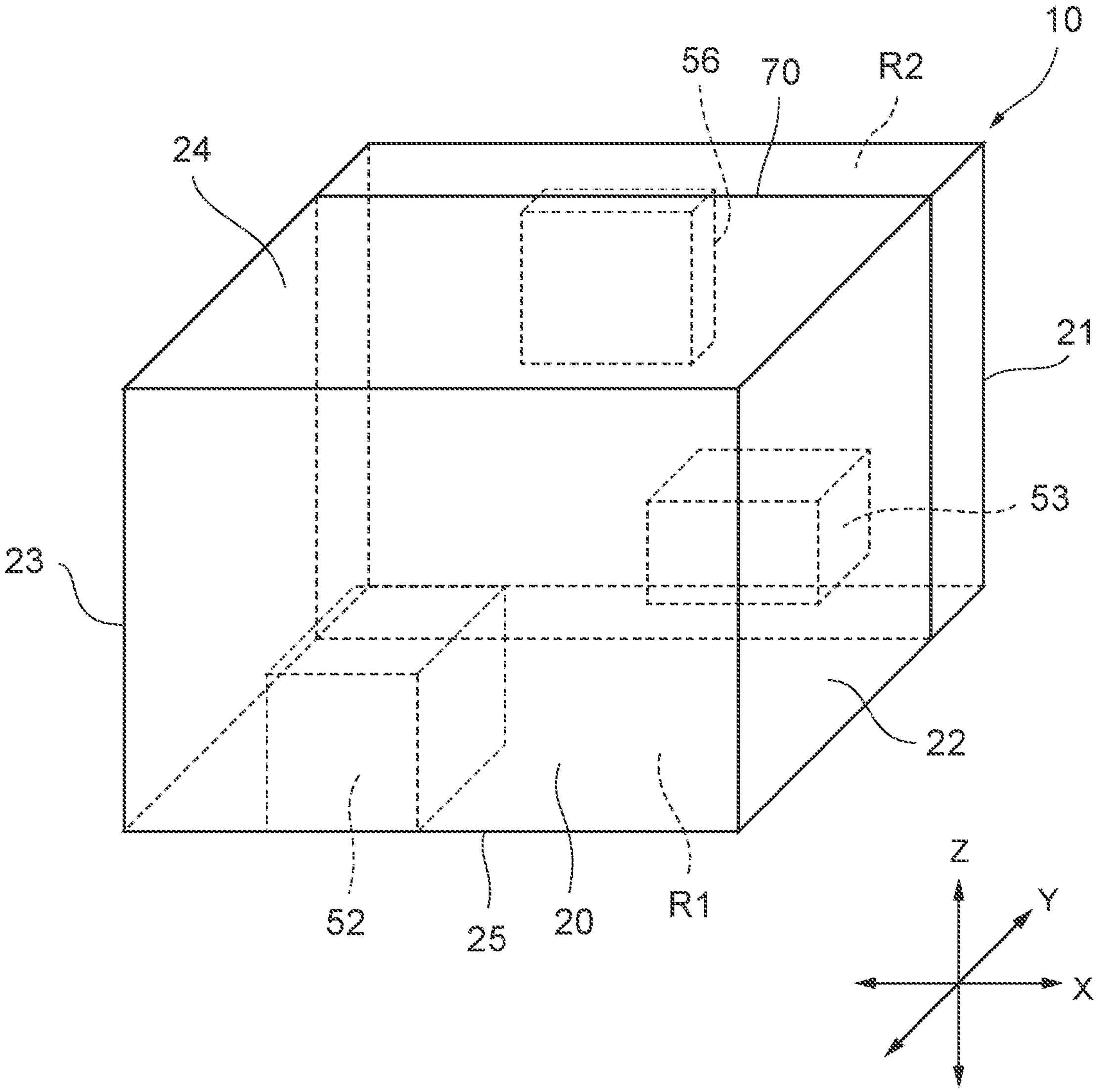
FIG. 3 is a schematic diagram illustrating a positional relationship between a measuring unit and a power supply in an apparatus housing.
Figure 4:
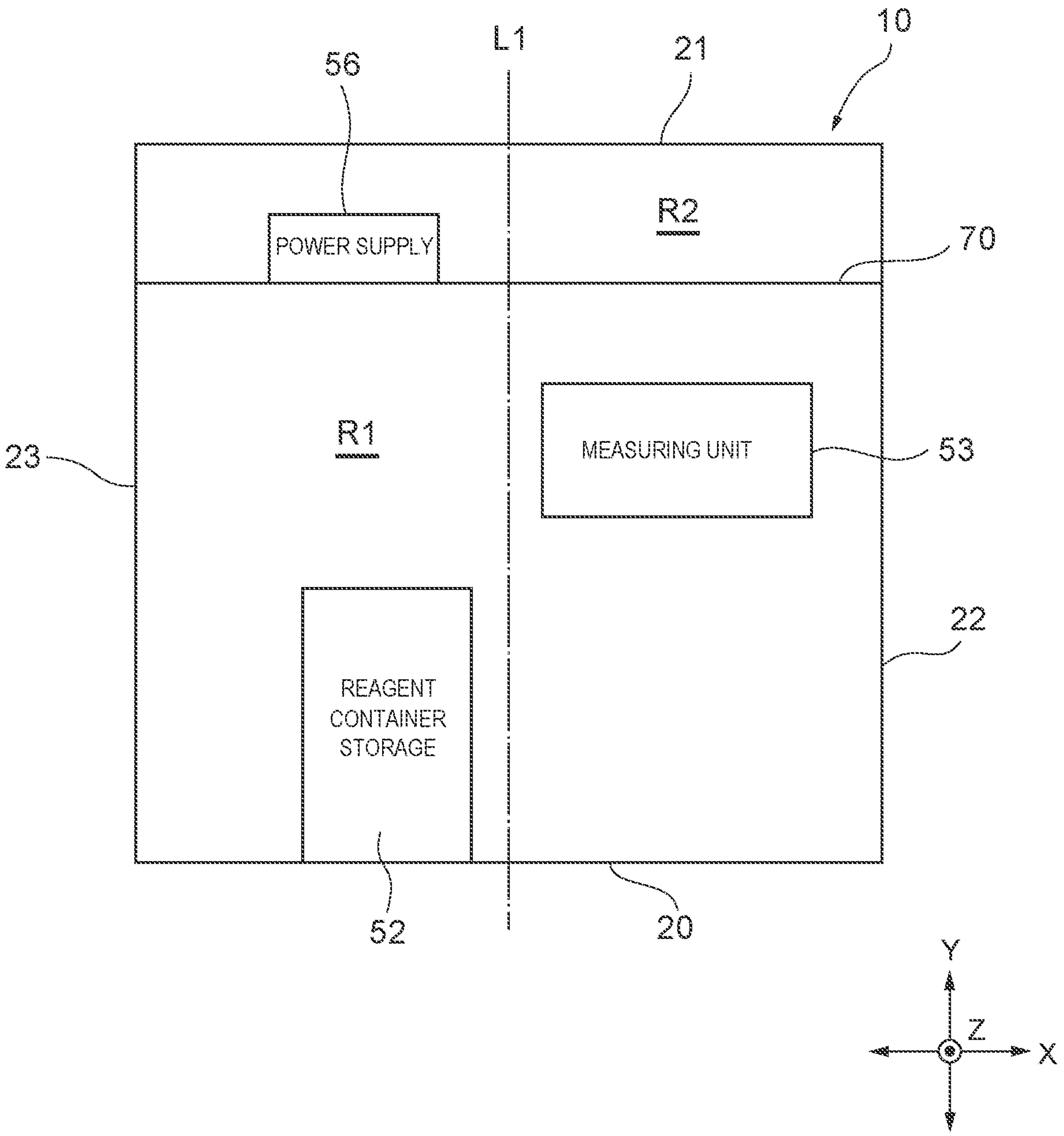
FIG. 4 is a schematic diagram illustrating the positional relationship between the measuring unit and the power supply viewing the apparatus housing from a top side.

Here, a positional relationship between the measuring unit 53 and the power supply 56 within the apparatus housing 10 is explained. FIG. 3 is a schematic diagram illustrating the positional relationship between the measuring unit 53 and the power supply 56 in the apparatus housing 10, FIG. 4 is a schematic diagram illustrating the positional relationship between the measuring unit 53 and the power supply 56 viewing the apparatus housing 10 from a top side, and FIG. 5 is a schematic diagram illustrating the positional relationship between the measuring unit 53 and the power supply 56 viewing the apparatus housing 10 horizontally from the front surface 20.

The measuring unit 53 is located in the main region R1, and the power supply 56 is located in the rear region R2. In other words, the measuring unit 53 and the power supply 56 are located in different regions in a plan view. As illustrated in FIG. 4, in the plan view of the apparatus housing 10, in case that an imaginary center line L1 is drawn passing through the center of a left/right direction X of the apparatus housing 10 and extending in the front/rear direction Y, and the interior of the apparatus housing 10 is bisected into left and right, the measuring unit 53 is located on a right side of the imaginary center line L1, and the power supply 56 is located on a left side of the imaginary center line L1. Also, the reagent container storage 52 is the same as the power supply 56 and located on the left side of the imaginary center line L1.

Figure 5:
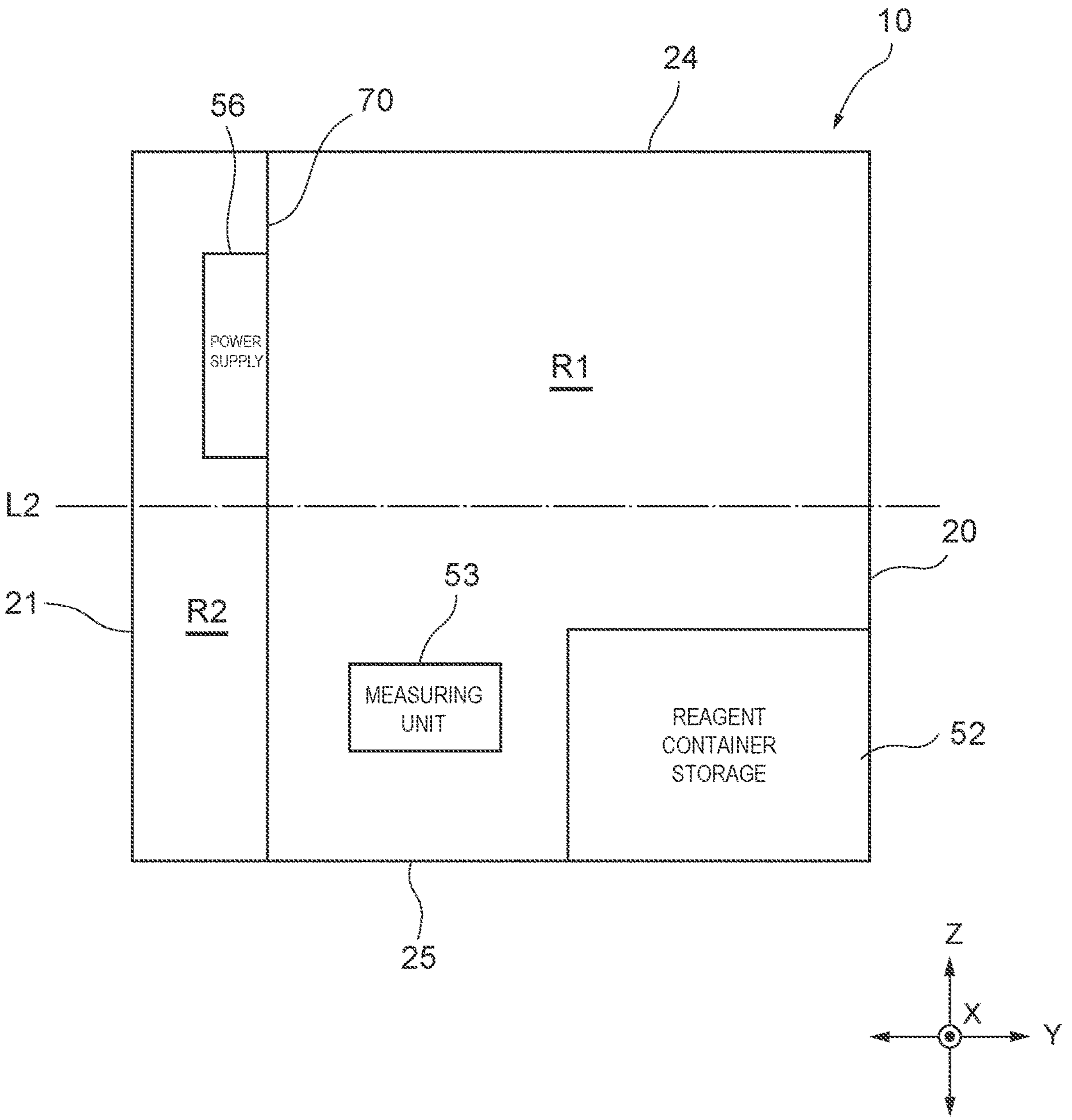
FIG. 5 is a schematic diagram illustrating the positional relationship between the measuring unit and the power supply viewing the apparatus housing horizontally from a front side.

As illustrated in FIG. 5, the power supply 56 is located at a higher position than the measuring unit 53. In other words, a bottom end of the power supply 56 is at the higher position than an upper end of the measuring unit 53. In a side view viewed from the front surface 20 of the apparatus housing 10, in case that an imaginary center line L2 is drawn passing through the center of a vertical direction Z of the apparatus housing and extending in the left/right direction X, and the interior of the apparatus housing is bisected into top and bottom, the measuring unit 53 is located below the imaginary center line L2, and the power supply 56 is located above the imaginary center line L2. Also, the reagent container storage 52 is located below the imaginary center line L2.

With the above mentioned arrangement of the measuring unit 53 and the power supply 56, the measuring unit 53 and the power supply 56 are physically and thermally separated. The measuring unit 53 and the power supply 56 are separated by a linear distance, e.g., 30 cm or more. Also, the reagent container storage 52 is arranged further away from the power supply 56 than the measuring unit 53.

Next, specific configuration examples of the sample rack storage 50, the reaction container storage 51, the reagent container storage 52, the measuring unit 53, the cleaner 54, the disposal section 55, the power supply 56, the controller 57, the dispenser 58, the first heat exhaust section 59, and the second heat exhaust section 60 illustrated in FIG. 2 are described.

The sample rack storage 50, the reaction container storage 51, the reagent container storage 52, the measuring unit 53, the cleaner 54, the disposal section 55, the dispenser 58, and the second heat exhaust section 60 are located in the main region R1 separated by the vertical plate 70, and the power supply 56, the controller 57, and the first heat exhaust section 59 are in the rear region R2.

The sample rack storage 50 is provided on a front surface 20 side rather than the center of the front/rear direction Y of the apparatus housing 10 and near the center of the left/right direction X of the apparatus housing 10. The sample rack storage 50 stores a sample rack that holds a plurality of sample containers. The sample rack storage 50 has a top surface 80, and a plurality of holes 81 are formed in the top surface 80. A pipette 260, which is described below, in the dispenser 58 can enter a sample container in the sample rack storage 50 through the hole 81 and aspirate a sample in the sample container. A sample rack in the sample rack storage 50 can be inserted and removed from the door 32 of the apparatus housing 10 illustrated in FIG. 1.

The reaction container storage 51 is provided on the front surface 20 side rather than the center of the front/rear direction Y of the apparatus housing 10 and to the right side of the center of the left/right direction X of the apparatus housing 10. The reaction container storage 51 stores a container rack 91 that holds a plurality of reaction containers 90.

Figure 6:
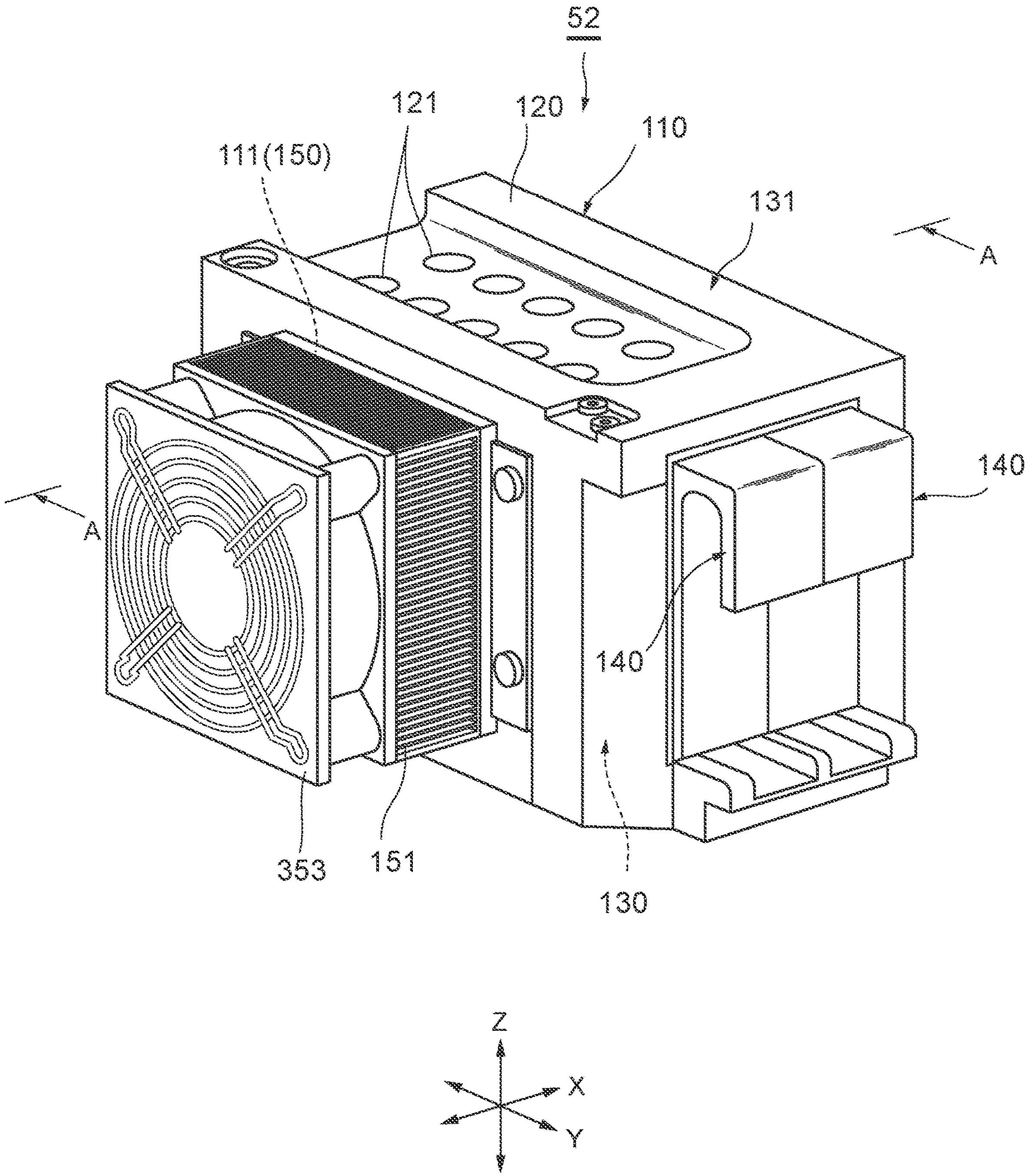
FIG. 6 is a perspective view illustrating a configuration of a reagent container storage.

The reagent container storage 52 is provided on the front surface 20 side rather than the center of the front/rear direction Y of the apparatus housing 10 and to the left side of the center of the left/right direction X of the apparatus housing 10. The reagent container storage 52 is provided to the left of the sample rack storage 50. The reagent container storage 52 stores a plurality of reagent containers filled with reagents. FIG. 6 is a perspective view illustrating the reagent container storage 52, and FIG. 7 is a longitudinal cross-sectional view illustrating the reagent container storage 52.

Figure 7:
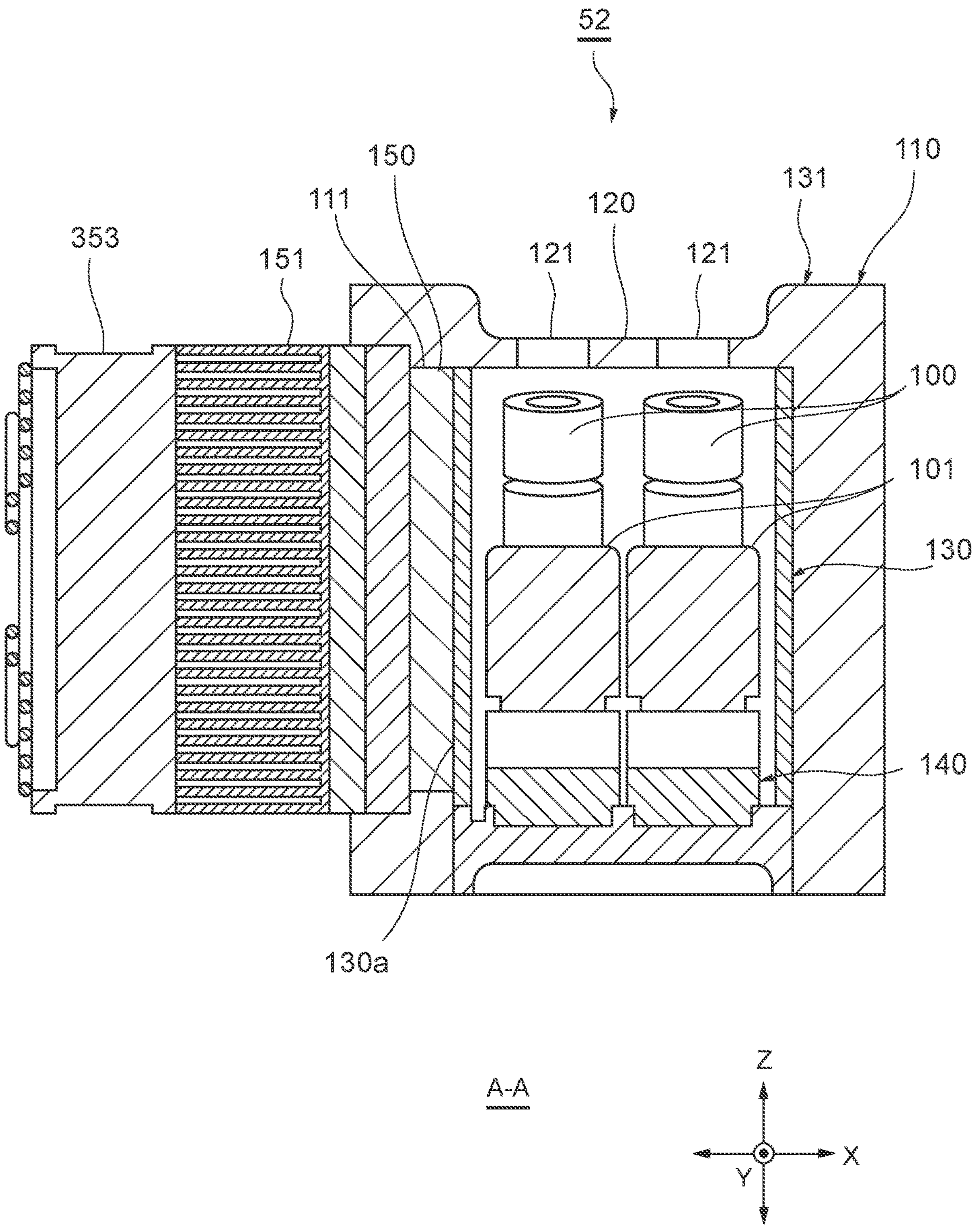
FIG. 7 is an A-A cross-sectional view illustrating the reagent container storage.

As illustrated in FIG. 6 and FIG. 7, the reagent container storage 52 has a housing 110 that stores a plurality of reagent containers 100 and a cooling section 111 that cools the housing 110. The housing 110 has a substantially rectangular shape that is long in the front/rear direction Y and forms a space with a substantially rectangular space inside.

The housing 110 has a top part 120, and a plurality of holes 121 are formed in the top part 120. The pipette 260 described below in the dispenser 58 can enter the reagent container 100 in the reagent container storage 52 through the hole 121 and aspirate a reagent in the reagent container 100.

As illustrated in FIG. 7, the housing 110 has a heat transfer housing section 130 that is made of a heat conductive material, such as aluminum, etc., and an insulation housing section 131 that is provided outside the heat transfer housing section 130 and made of an insulation material, such as a Styrofoam, a cellulose fiber, etc.

Figure 8:
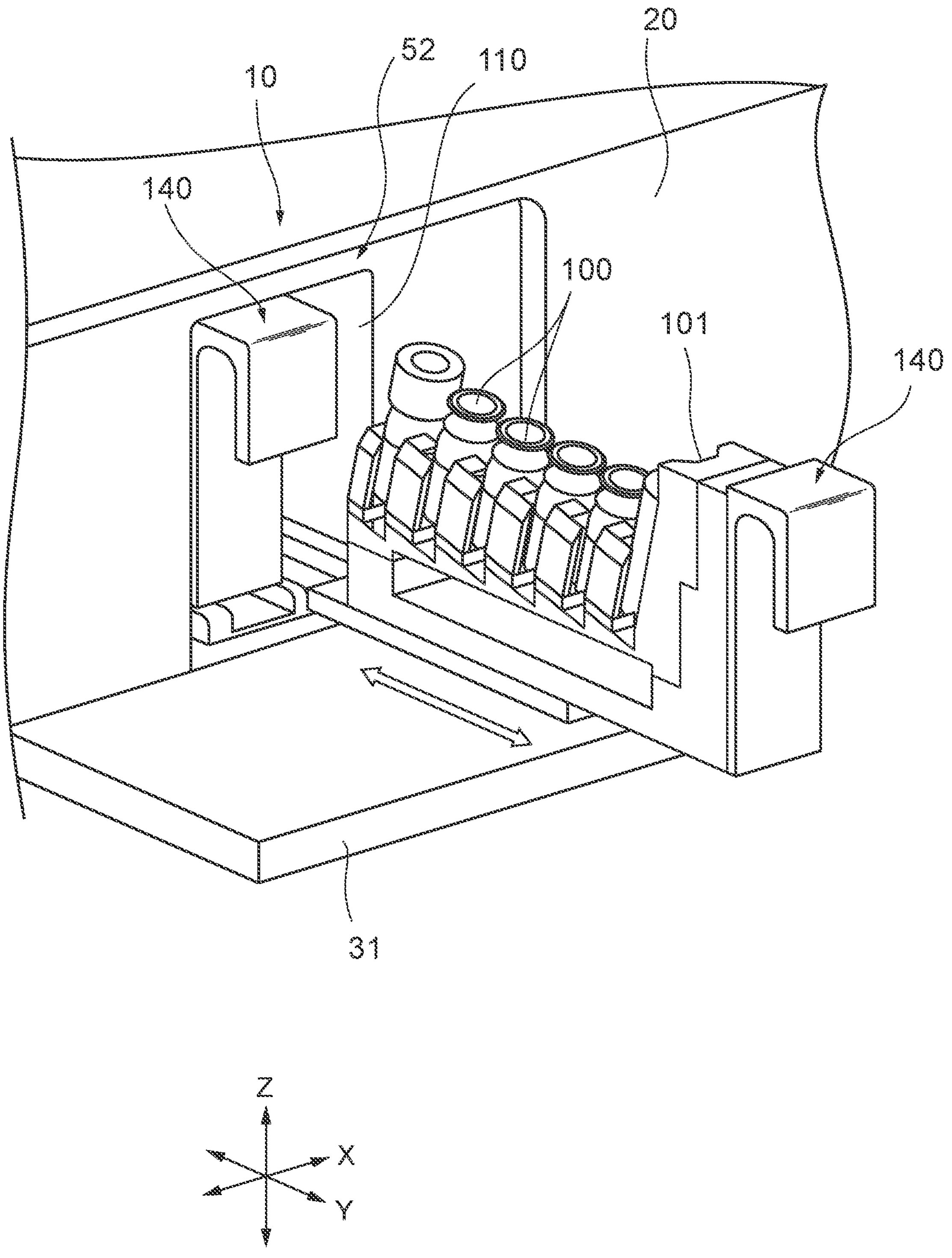
FIG. 8 is a schematic diagram illustrating a structure of a rack support.

A rack support 140 is provided in the housing 110. The rack support 140 supports a reagent container rack 101 that holds a plurality of reagent containers 100 in a row, as illustrated in FIG. 8. The rack support 140 can be withdrawn freely from the apparatus housing 10 and the housing 110. By moving the rack support 140 in and out of the door 31 of the apparatus housing 10, the reagent container rack 101 and the reagent container 100 can be moved in and out of the housing 110.

As illustrated in FIG. 7, the cooling section 111 is a Peltier element 150. The Peltier element 150 has a square plate shape. The Peltier element 150 is bonded to an outer surface of a side wall 130*a*, which is the left side of the heat transfer housing section 130 of the housing 110 in the left/right direction X. A heat sink 151 is provided on the outer surface of the Peltier element 150 as a heat radiator that radiates heat from the Peltier element 150.

The measuring unit 53 illustrated in FIG. 2 has a heater 160 and a detector 161. The heater 160 and the detector 161 are provided on the rear surface 21 side rather than the center of the front/rear direction Y of the apparatus housing 10 and to the right side of the center of the left/right direction X of the apparatus housing 10.

Figure 9:
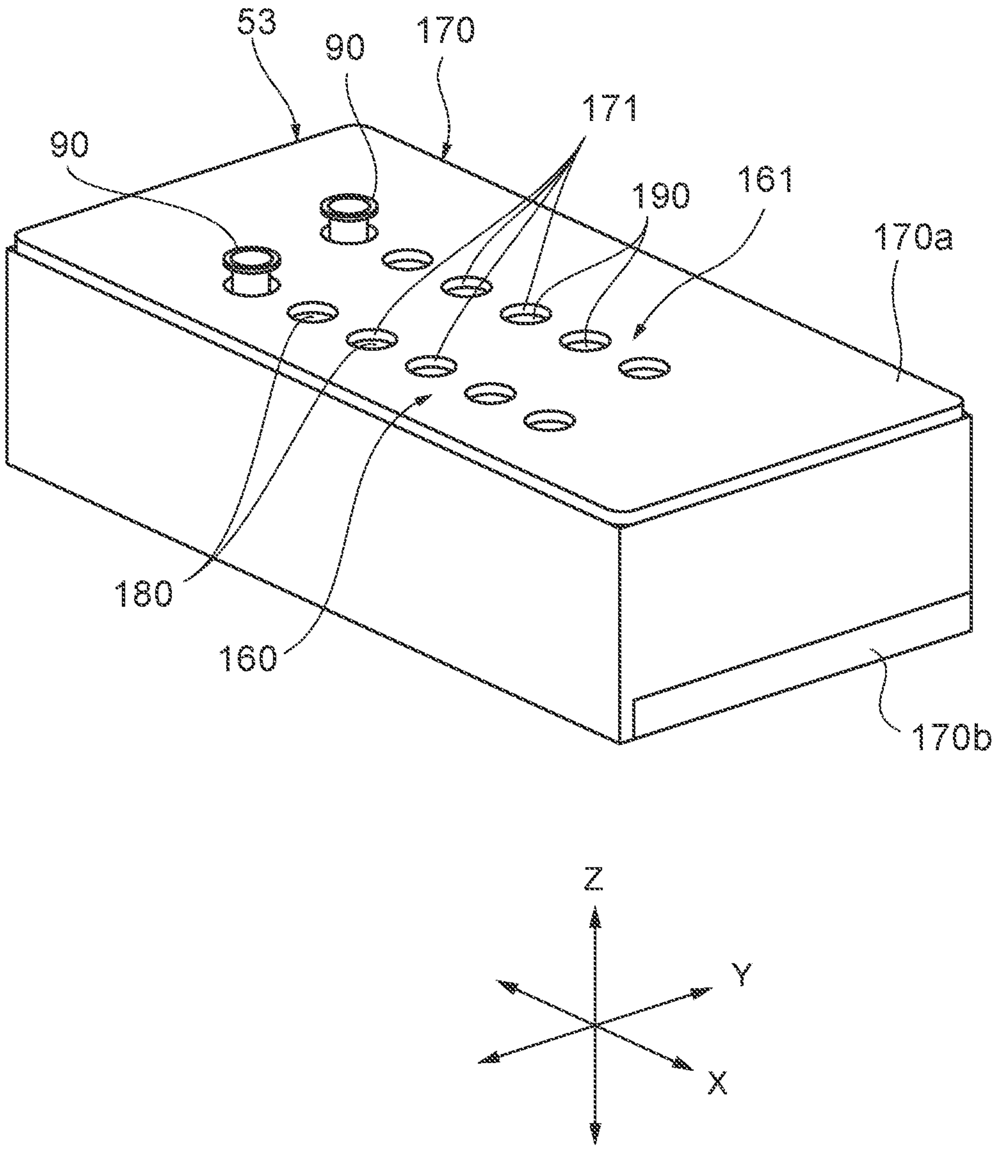
FIG. 9 is a perspective view illustrating the measuring unit.
Figure 10:
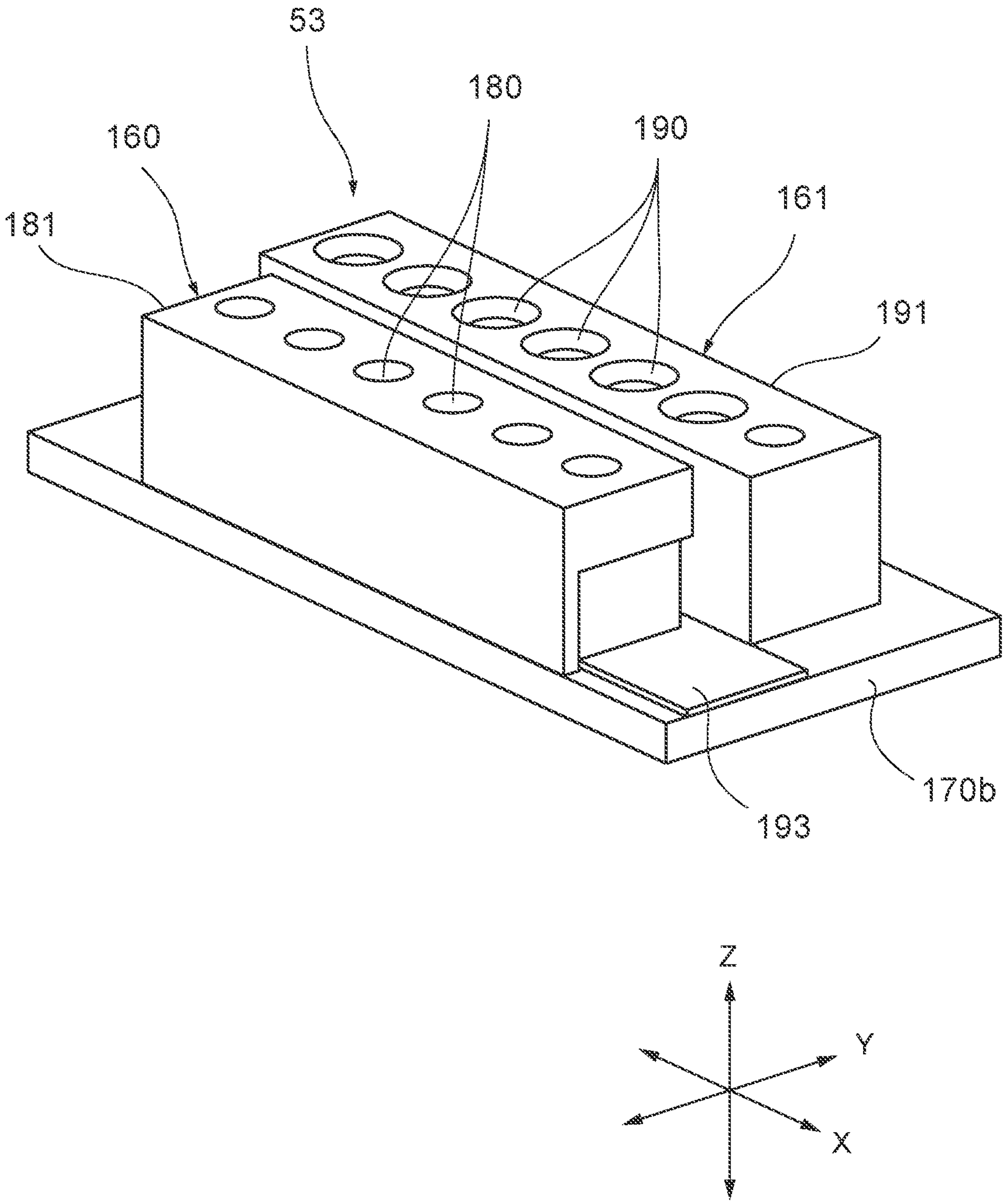
FIG. 10 is an explanatory diagram illustrating an internal structure of the measuring unit.

FIG. 9 is a perspective view illustrating the measuring unit 53, and FIG. 10 is an explanatory diagram illustrating an internal structure of the measuring unit 53. The measuring unit 53 has a housing 170 that includes the heater 160 and the detector 161. The housing 170 has a substantially rectangular shape. A plurality of holes 171 are formed in a top section 170*a* of the housing 170.

The heater 160 has a first holder 181 that has a plurality of holding holes 180, which hold the reaction container 90, inside the housing 170. The first holder 181 has a rectangular shape that is long in the left/right direction X. The plurality of holding holes 180 are arranged in a row in the left/right direction X. The holding hole 180 is connected to the hole 171 on the top section 170*a* of the housing 170.

The detector 161 has a second holder 191 that has a plurality of holding holes 190, which hold the reaction container 90, inside the housing 170. The second holder 191 has a rectangular shape that is long in the left/right direction X. The plurality of holding holes 190 are arranged in a row in the left/right direction X. The second holder 191 is provided on the rear surface 21 side of the first holder 181. The holding hole 190 is connected to the hole 171 on the top section 170*a* of the housing 170.

Figure 11:
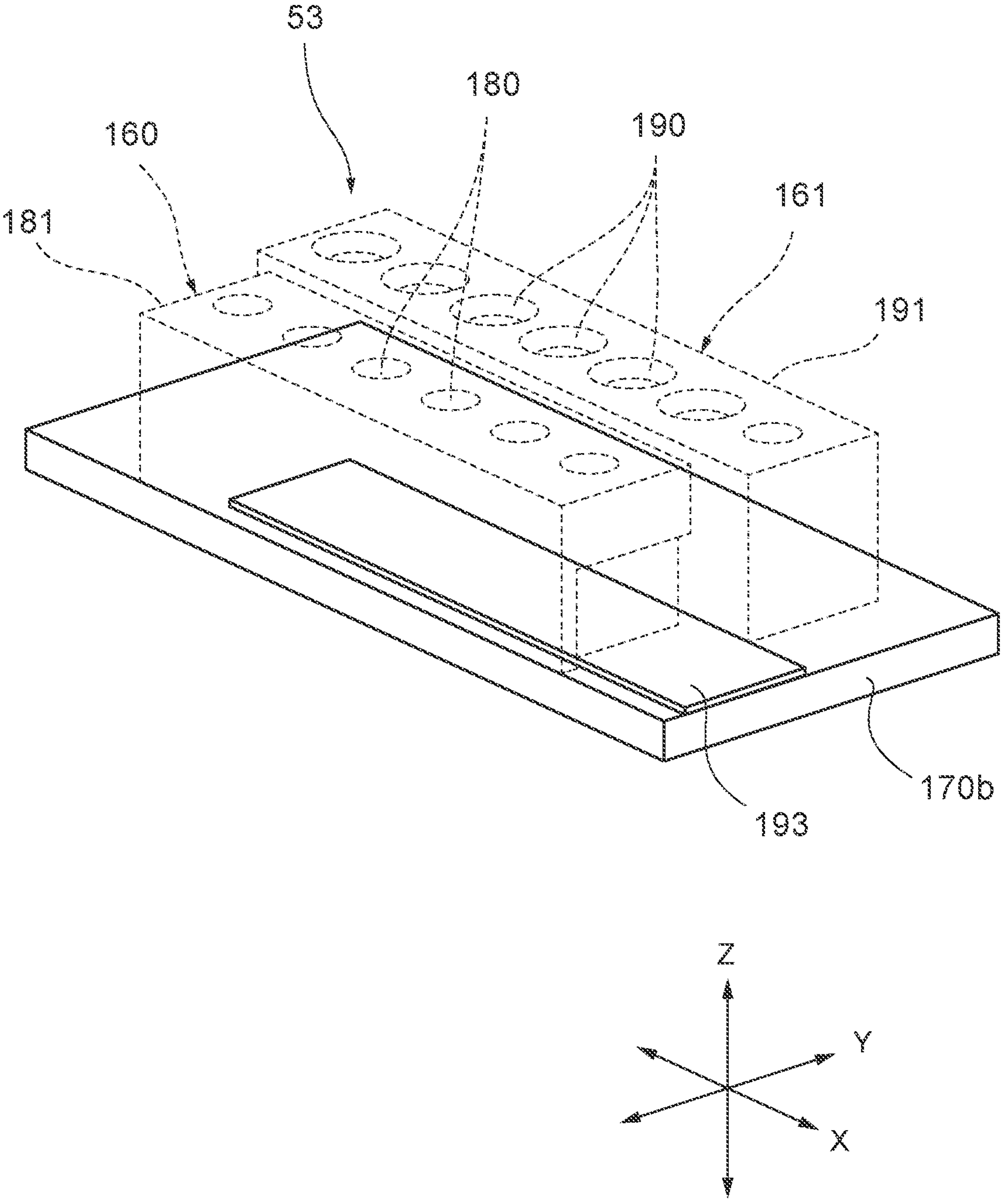
FIG. 11 is an explanatory diagram illustrating a temperature controller of the measuring unit.

As illustrated in FIG. 11, a temperature controller 193 is provided on a bottom section 170*b* of the housing 170. The temperature controller 193 has a square thin plate shape. The temperature controller 193 can adjust the reaction container 90 held in the holding hole 180 of the heater 160 and the holding hole 190 of the detector 161 to a predetermined temperature.

Figure 12:
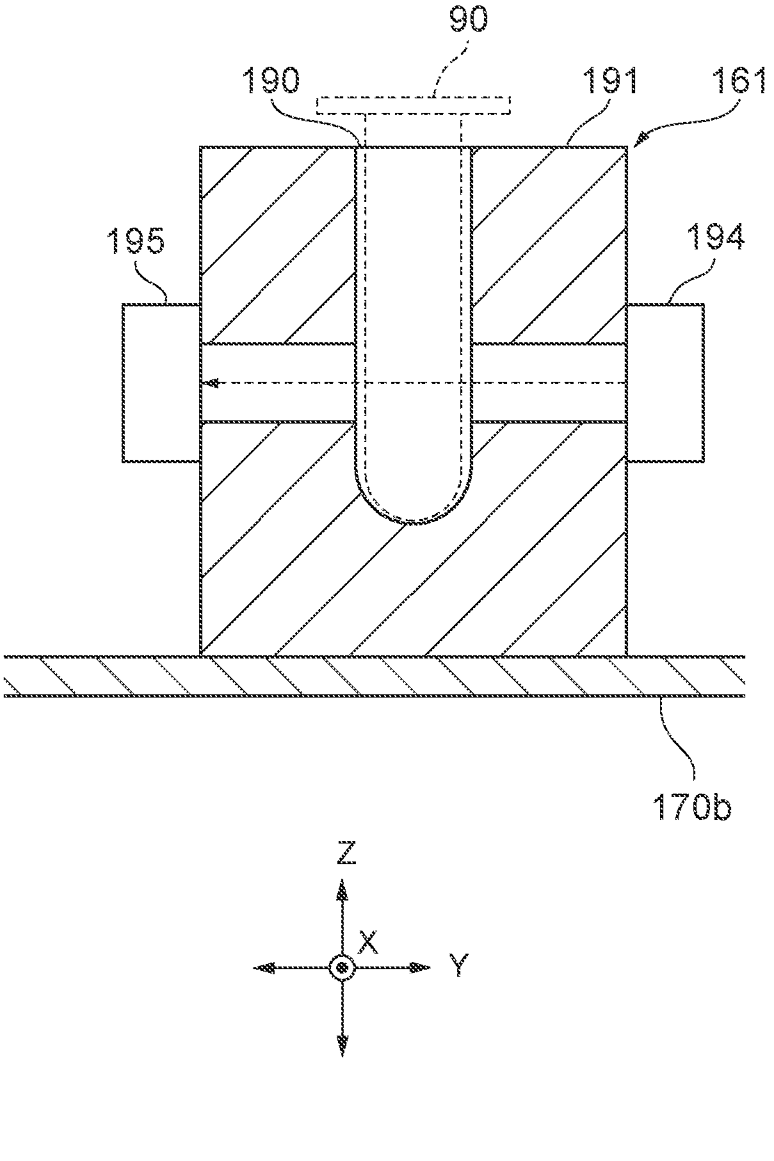
FIG. 12 is an explanatory diagram illustrating an irradiation section and a light receiving section of the measuring unit.

As illustrated in FIG. 12, the detector 161 has an irradiation section 194 that irradiates light to the reaction container 90 held in the second holder 191 and a light receiving section 195 that receives light transmitted through the reaction container 90. The detector 161, by irradiating light to a sample in the reaction container 90 with the irradiation section 194 and receiving the light transmitted through the sample with the light receiving section 195, can detect measurement data related to the sample.

The cleaner 54 illustrated in FIG. 2 is provided near the center of the front/rear direction Y of the apparatus housing 10 and between the measuring unit 53 and the reaction container storage 51. The cleaner 54 has a cleaning tank 200 that cleans the pipette 260 of the dispenser 58.

The disposal section 55 is provided between the measuring unit 53 and the reaction container storage 51. The disposal section 55 has a disposal port 210 that disposes the reaction container 90.

Figure 13:
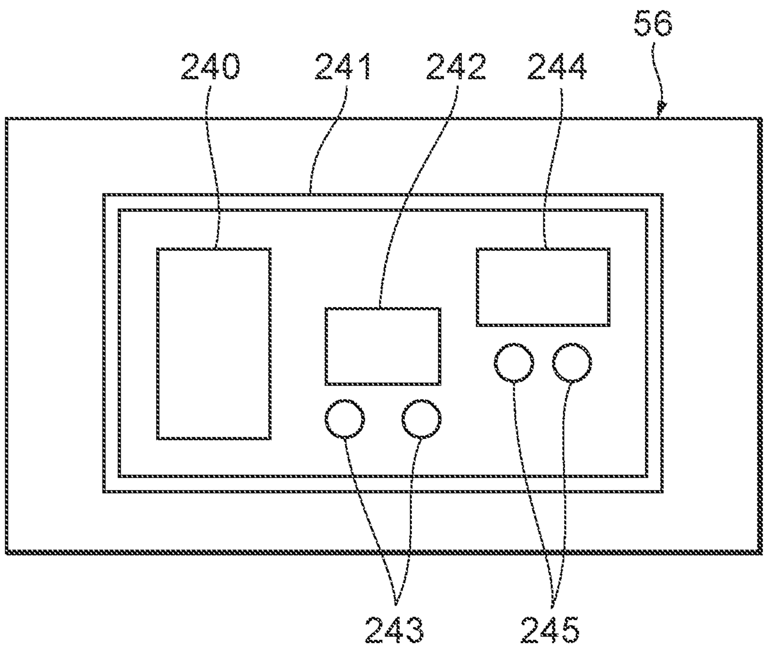
FIG. 13 is a schematic diagram illustrating an example of a configuration of the power supply.

The power supply 56 is provided near the rear surface 21 of the apparatus housing 10 in the front/rear direction Y and to the left side rather than the center of the apparatus housing 10 in the left/right direction X. The power supply 56 has a square, thick, plate-shaped outline. The power supply 56 converts power supplied from an external power source from AC to DC and supplies the DC power to various apparatuses, such as the reagent container storage 52, the measuring unit 53, the controller 57, the dispenser 58, the first heat exhaust section 59, the second heat exhaust section 60, etc. As an example, the power supply 56 converts 100V AC to 12V DC. In this process, the power supply 56 itself generates heat and rises to about 60° C. (or higher), and the apparatus housing 10 near where the power supply 56 is installed rises to nearly 45° C. Thus, the heat generated in the power supply 56 can affect the temperature of apparatuses, such as the measuring unit 53, etc. located in the apparatus housing 10. An example of a configuration of the power supply 56 is illustrated in FIG. 13. For example, the power supply 56 is provided with a coil 240, a chassis 241, a transformer 242, a capacitor 243, a protection circuit 244, a diode 245, etc. as its components. The coil 240 is, for example, a noise filter and excludes noise generated in a power supply circuit. The chassis 241 protects a component of the power supply 56. The transformer 242 steps down an AC voltage. The capacitor 243 and the diode 245 convert AC current to DC current. The protection circuit 244 protects a current from exceeding a rated output. In such a case, among these components of the power supply 56, the coil 240 and the chassis 241 are hot in this order. At least the coil 240 of the power supply 56 may be located in an area different from the measuring unit 53 in a plan view and is located at a higher position than the measuring unit 53. Also, preferably, in addition to the coil 240, the chassis 241 of the power supply 56 may be located in an area different from the measuring unit 53 in a plan view and at a higher position than the measuring unit 53.

Figure 14:
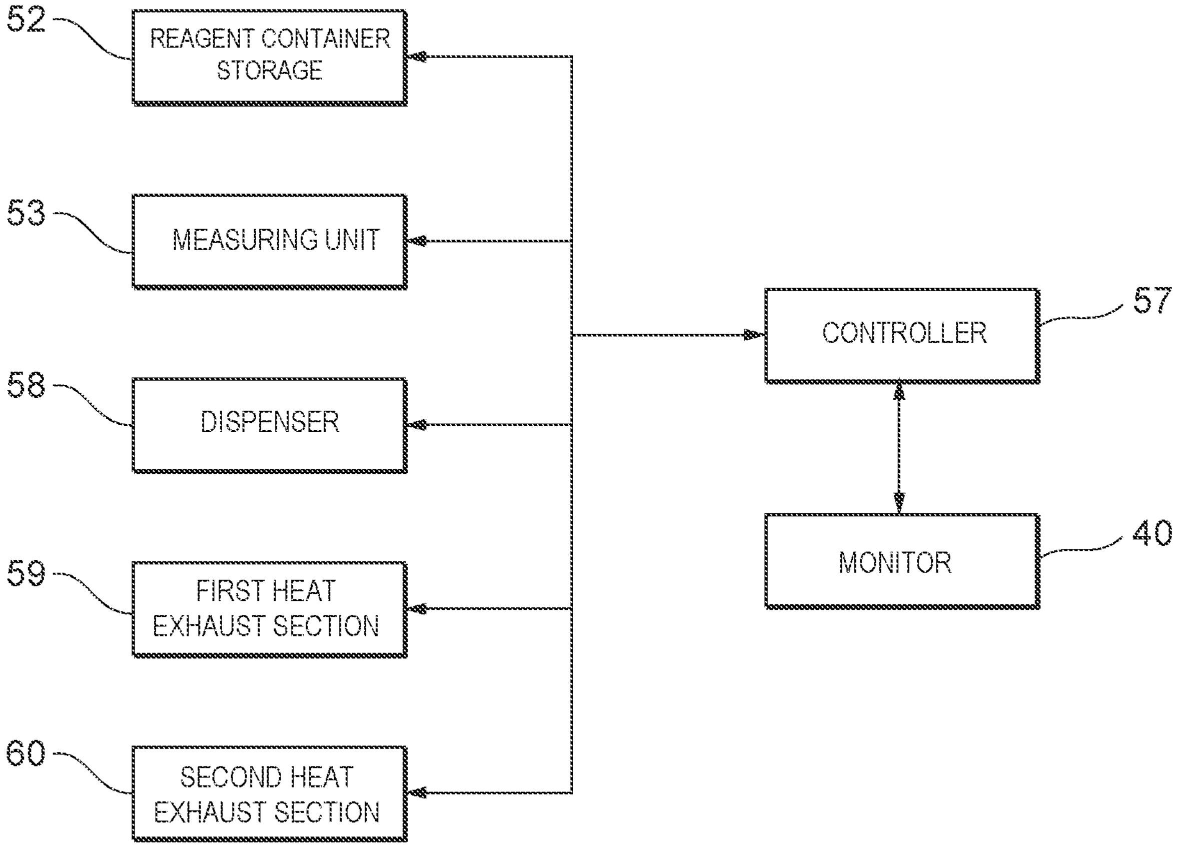
FIG. 14 is a block diagram illustrating a control of the sample measuring apparatus.

The controller 57 is provided near the rear surface 21 of the apparatus housing 10 in the front/rear direction Y and to the right side rather than the center of the apparatus housing 10 in the left/right direction X. The controller 57 is provided in the rear region R2 same as the power supply 56 and is provided next to the power supply 56 in the left/right direction X. The controller 57 can, as illustrated in FIG. 14, communicate with various apparatuses, such as the reagent container storage 52, the measuring unit 53, the dispenser 58, the first heat exhaust section 59, the second heat exhaust section 60, etc., and controls operations of the various apparatuses. The controller 57 has a memory and a CPU, and the CPU can control the various apparatuses and perform a sample measurement by executing a program stored in the memory. The controller 57 can communicate with the monitor 40, can execute a sample measurement based on information input from the monitor 40, and can display a result of the sample measurement on the monitor 40.

The dispenser 58 illustrated in FIG. 2 has a function of dispensing to a sample container, the reaction container 90, and the reagent container 100. The dispenser 58 has a dispensing apparatus 250 and a moving apparatus 251 that moves the dispensing apparatus 250.

Figure 15:
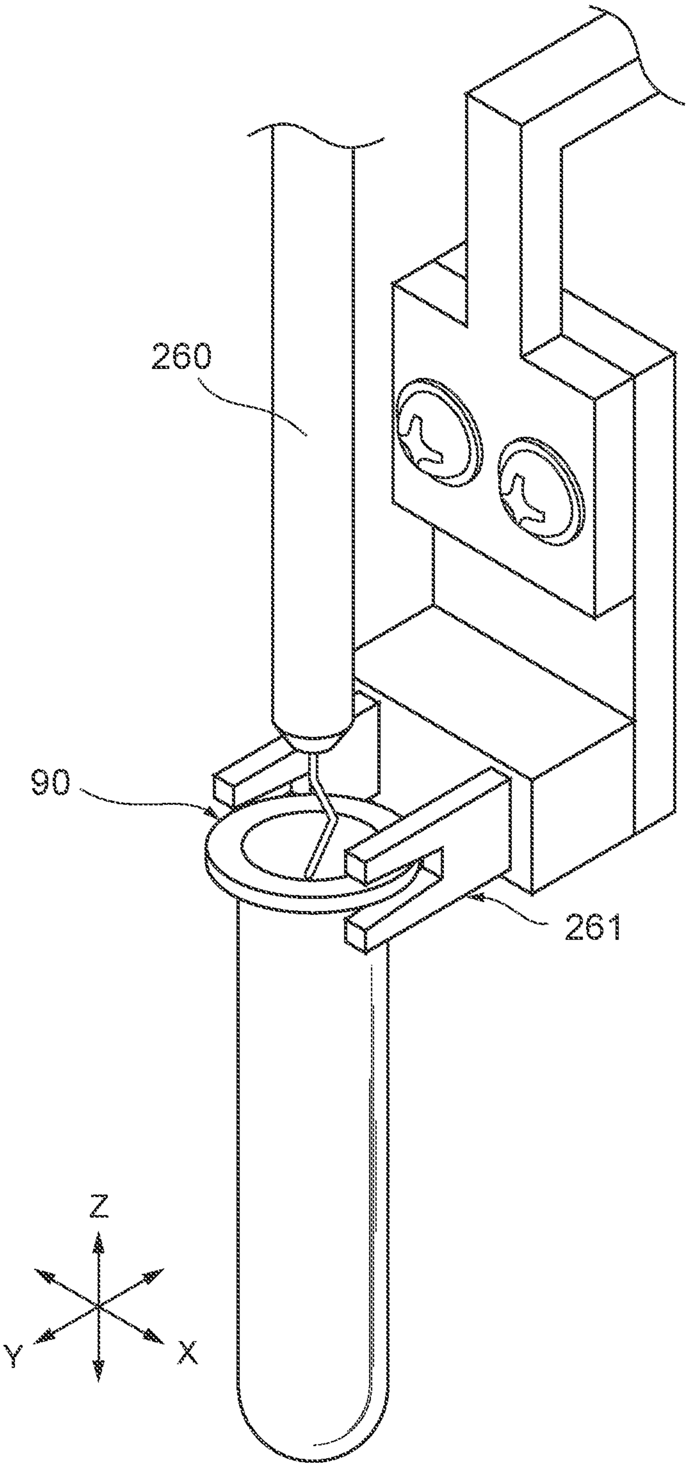
FIG. 15 is a perspective view illustrating a configuration of a container holder and a pipette of a dispensing apparatus.

The dispensing apparatus 250 has, as illustrated in FIG. 15, the pipette 260 that aspirates liquid and dispenses the aspirated liquid and a container holder 261 that holds the reaction container 90. The dispensing apparatus 250 is configured to be able to move the pipette 260 and the container holder 261 up and down on the same axis in the vertical direction Z.

The moving apparatus 251 illustrated in FIG. 2 is configured to transfer the entire dispensing apparatus 250 to any position in the left/right direction X and the front/rear direction Y within the apparatus housing 10. The dispenser 58 can move the pipette 260 and aspirate or dispense liquid to a sample container in the sample rack storage 50, the reaction container 90 in the reaction container storage 51, the reagent container 100 in the reagent container storage 52, and the reaction container 90 in the measuring unit 53. Also, the dispenser 58 can hold the reaction container 90 in the reaction container storage 51 and transport the reaction container 90 to the measuring unit 53 and the disposal section 55. In addition, as illustrated in FIG. 15, while the reaction container 90 is held in the container holder 261, the dispenser 58 can supply liquid from the pipette 260 to the reaction container 90.

Figure 16:
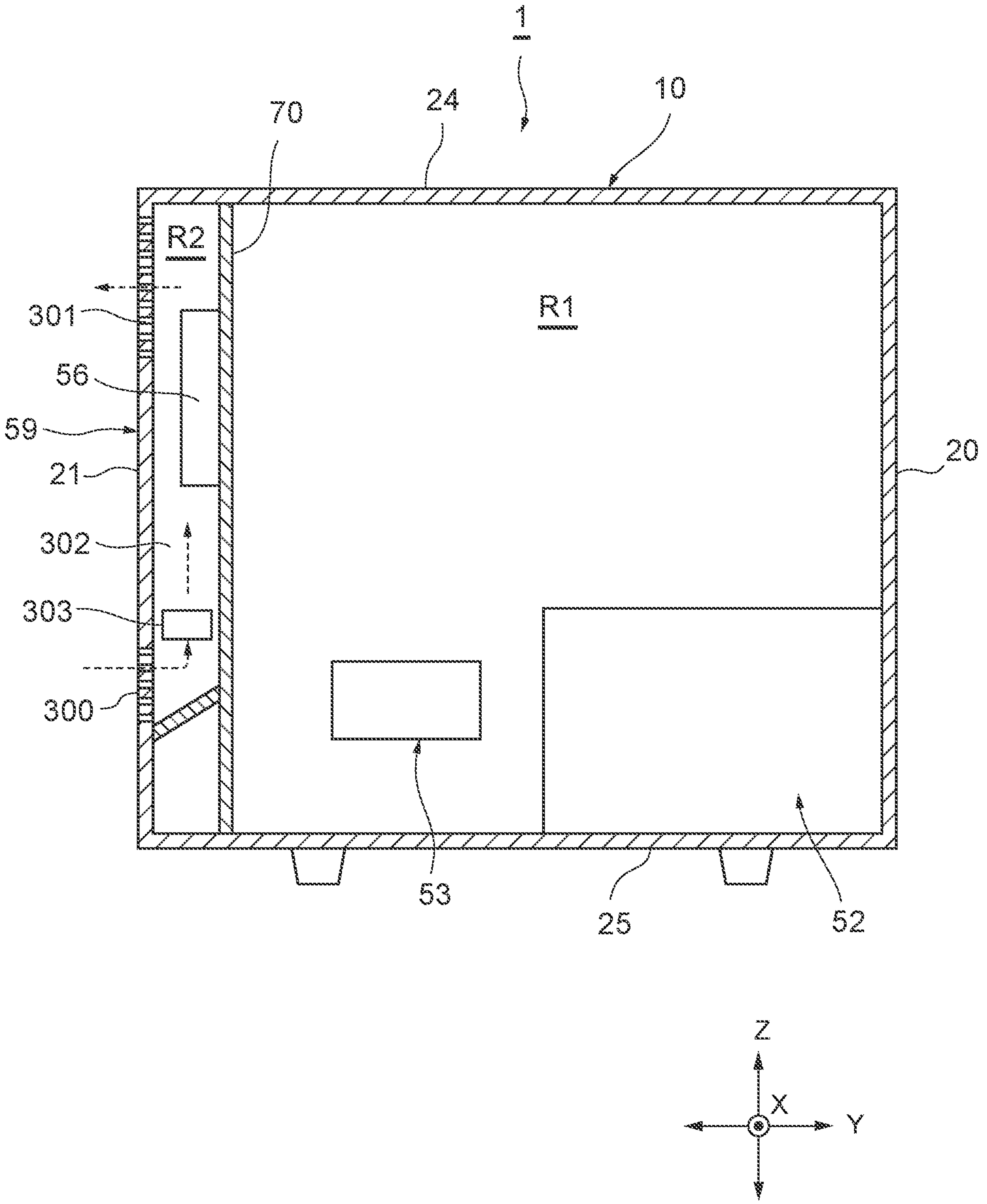
FIG. 16 is a partial cross-sectional view of the sample measuring apparatus illustrating a configuration of a first heat exhaust section.
Figure 17:
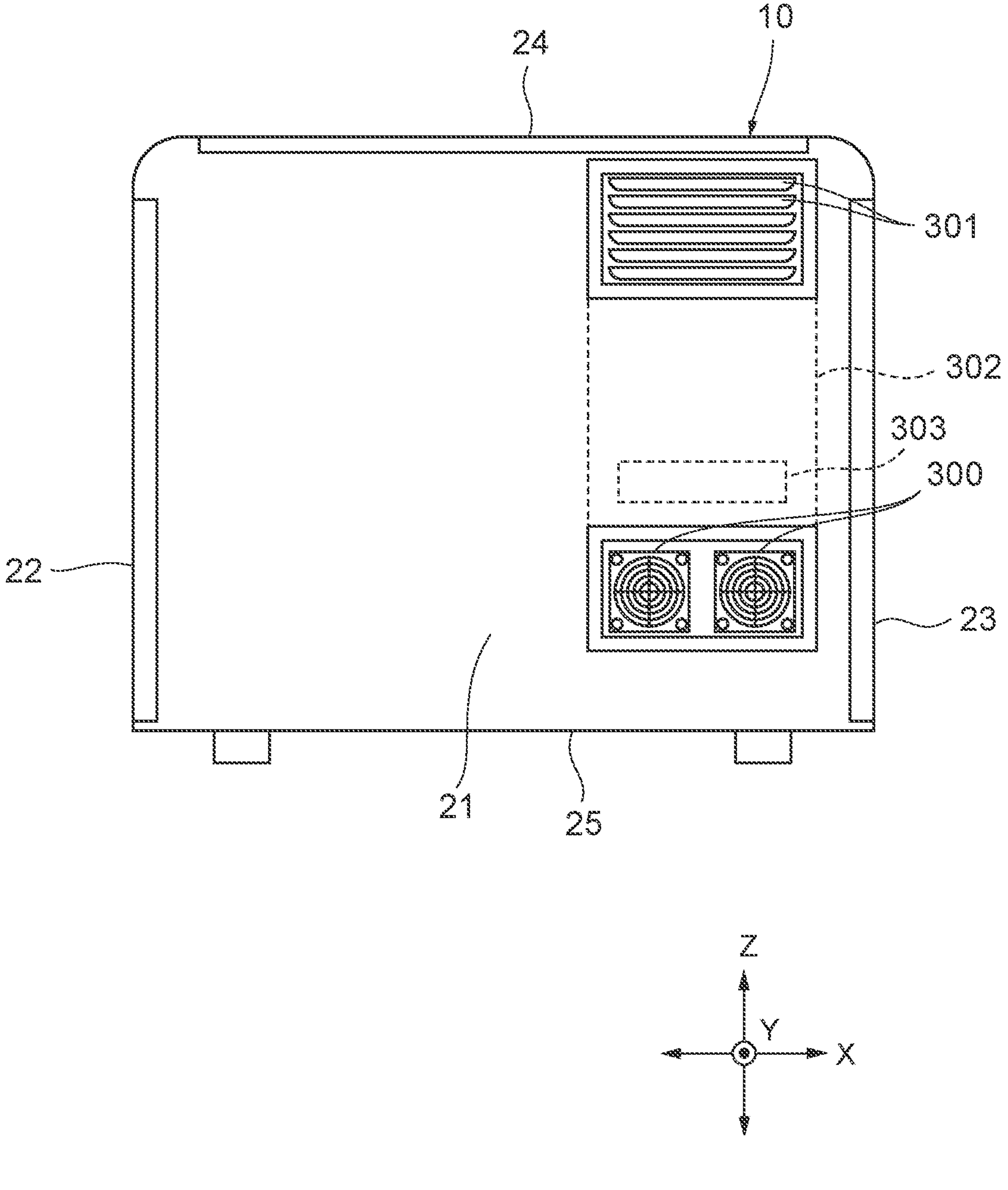
FIG. 17 is a rear view illustrating the apparatus housing.

The first heat exhaust section 59 illustrated in FIG. 2 exhausts heat of the power supply 56 to outside of the apparatus housing 10. FIG. 16 is a cross-sectional view illustrating the first heat exhaust section 59. FIG. 17 is a rear view of the apparatus housing 10. As illustrated in FIG. 16, the first heat exhaust section 59 has a first intake port 300 that takes in air from outside of the apparatus housing 10 into the second region R2 inside the apparatus housing 10, a first exhaust port 301 that exhausts air from the second region R2 to outside of the apparatus housing 10, a first duct 302 that leads from the first intake port 300 to the power supply 56 and from the power supply 56 to the first exhaust port 301, and a first fan 303 that flows air from the first intake port 300 to the first exhaust port 301.

As illustrated in FIG. 16 and FIG. 17, the first intake port 300 and the first exhaust port 301 are provided on the rear surface 21 of the apparatus housing 10. The first intake port 300 and the first exhaust port 301 are provided opposite the power supply 56, i.e., on a left side surface 23 side rather than the center of the rear surface 21 in the left/right direction X. The first intake port 300 and the first exhaust port 301 are arranged vertically, and the first exhaust port 301 is located at a higher position than the first intake port 300. The first intake port 300 is located lower than the power supply 56, and the first exhaust port 301 is located upper than the power supply 56. The first intake port 300 is formed as a concentric slit. The first exhaust port 301 is formed in a slit shape that is long in the left/right direction X. A plurality of the first exhaust ports 301 are arranged side by side in the vertical direction Z.

The first duct 302 is formed to reach the first exhaust port 301 from the first intake port 300 through the power supply 56. The first duct 302 is formed to extend in the vertical direction Z. The first fan 303 is provided between the power supply 56 in the first duct 302 and the first intake port 300.

Figure 18:
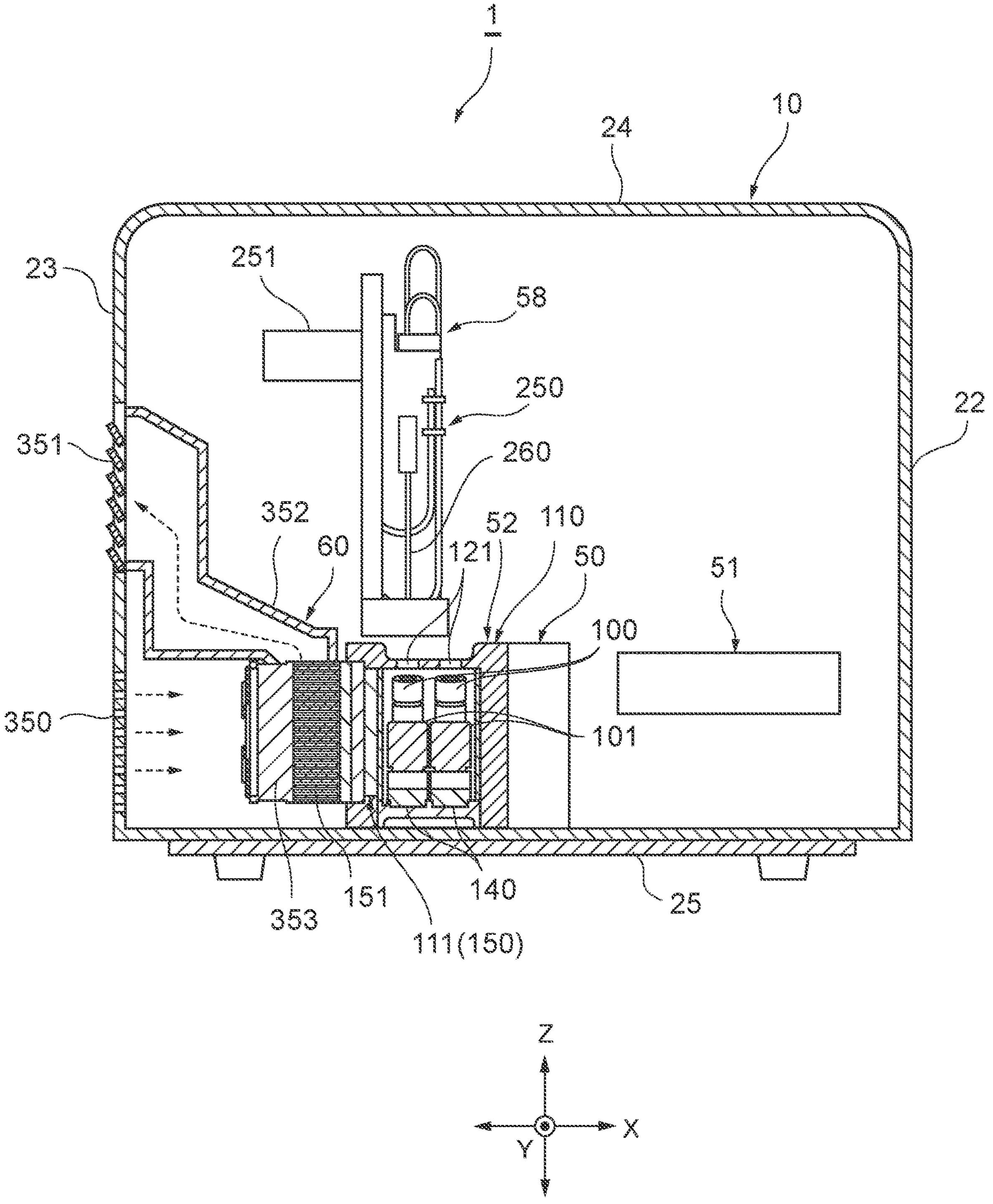
FIG. 18 is a partial cross-sectional view of the sample measuring apparatus illustrating a configuration of a second heat exhaust section.
Figure 19:
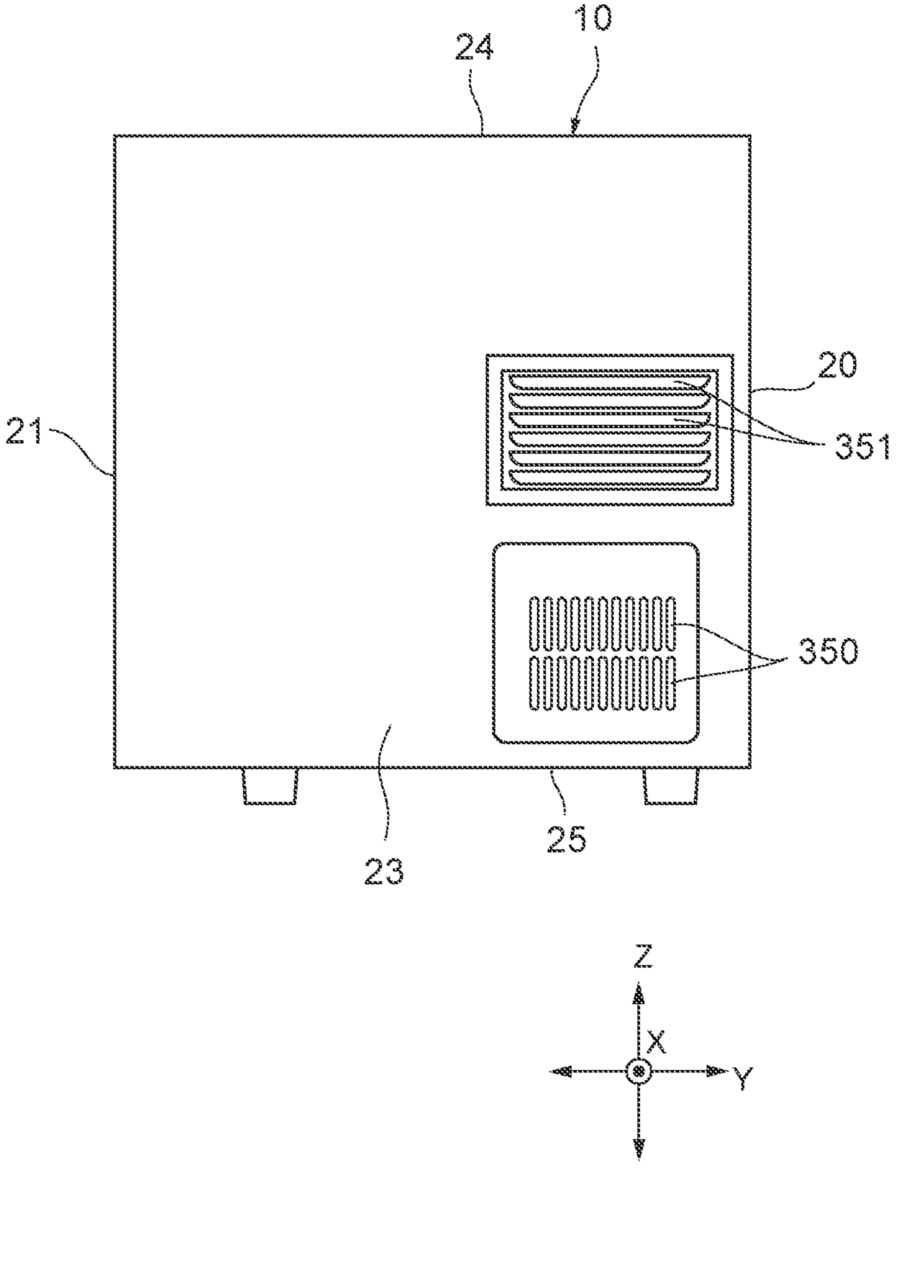
FIG. 19 is a side view illustrating a left side of the apparatus housing.

The second heat exhaust section 60 illustrated in FIG. 2 exhausts heat generated by the Peltier element 150 in the reagent container storage 52 to the outside of the apparatus housing 10. FIG. 18 is a cross-sectional view illustrating a configuration of the second heat exhaust section 60. FIG. 19 is a side view illustrating the left side surface 23 of the apparatus housing 10.

As illustrated in FIG. 18, the second heat exhaust section 60 has a second intake port 350 that takes in air from outside of the apparatus housing 10 into an area where the heat sink 151 is located as an area for radiating heat of the Peltier element 150 of the apparatus housing 10, a second exhaust port 351 that exhausts heat from the area where the heat sink 151 is located to the outside of the apparatus housing 10, a second duct 352 that leads from the second intake port 350 to the area where the heat sink 151 is located and from the area where the heat sink 151 is located to the second exhaust port 351, and a second fan 353 that flows air from the second intake port 350 to the second exhaust port 351.

The second intake port 350 and the second exhaust port 351 are provided on the left side surface 23 of the apparatus housing 10. The second intake port 350 and the second exhaust port 351 are provided opposite the reagent container storage 52, i.e., on a front surface 20 side rather than the center of the left side surface 23 in the front/rear direction Y. As illustrated in FIG. 19, the second intake port 350 and the second exhaust port 351 are arranged vertically, and the second exhaust port 351 is provided at a higher position than the second intake port 350. The second intake port 350 is formed in a slit shape that is long in the vertical direction Z, and a plurality of the second intake ports 350 are arranged side by side in the left/right direction X. The second exhaust port 351 is formed in a slit shape that is long in the left/right direction X, and a plurality of the second exhaust ports 351 are arranged side by side in the vertical direction Z.

As illustrated in FIG. 18, the second duct 352 is formed to reach the second fan 353 from the second intake port 350 and the second exhaust port 351 from the heat sink 151.

Sample Measurement Method

Figure 20:
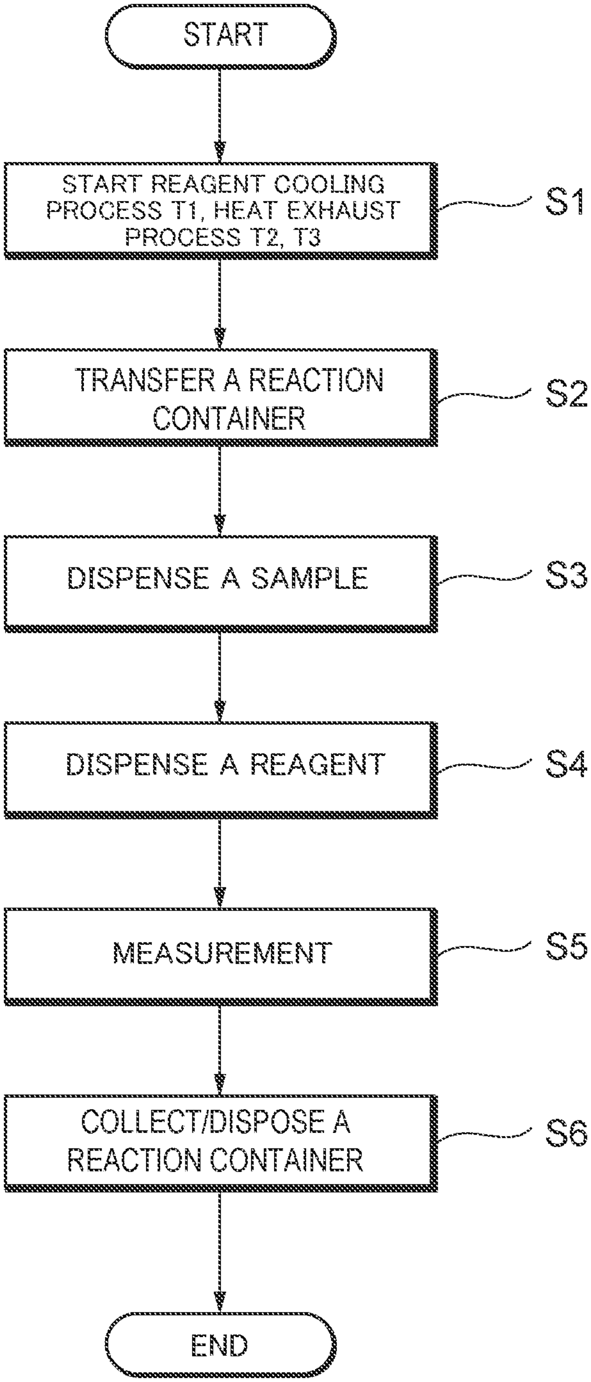
FIG. 20 is a flow diagram illustrating a sample measuring method.

Next, an example of a sample measurement using the sample measuring apparatus 1 configured as described above is described. FIG. 20 is an example of a processing flow illustrating the overall sample measurement.

In a sample measurement of the sample measuring apparatus 1, a starting process of a reagent cooling process T1 and heat exhaust processes T2 and T3 S1, a transferring process of a reaction container S2, a dispensing process of a sample S3, a dispensing process of a reagent S4, a measuring process S5, and a collecting and disposal process of a reaction container S6 are mainly performed in this order. The reagent cooling process T1 and the heat exhaust processes T2 and T3 are performed continuously while the other processes S2 to S6 are performed. Each of these processes is performed by the controller 57.

First, the reagent cooling process T1 and the heat exhaust processes T2 and T3 are initiated (process S1 in FIG. 20). In the reagent cooling process T1, the Peltier element 150 of the cooling section 111 illustrated in FIG. 7 is activated, and the housing 110 is cooled. At this time, the Peltier element 150 absorbs heat from the heat transfer housing section 130 of the housing 110. Therefore, the housing 110 is cooled, thereby lowering the temperature of an interior space of the housing 110 below a target temperature.

In the heat exhaust process T3 of the second heat exhaust section 60, as illustrated in FIG. 18, the second fan 353 outside the Peltier element 150 is activated, and air outside the apparatus housing 10 flows into the second duct 352 from the second intake port 350 and is supplied to the heat sink 151. The heat generated by an operation of the Peltier element 150 is radiated by touching the air at the heat sink 151. The air that passes through the heat sink 151 passes through the second duct 352 along with the heat to reach the second exhaust port 351 and is exhausted from the second exhaust port 351 to the outside of the apparatus housing 10. Thus, the heat generated by the Peltier element 150 is exhausted to the outside of the apparatus housing 10.

In the heat exhaust process T2 of the first heat exhaust section 59, as illustrated in FIG. 16, the first fan 303 in the rear region R2 where the power supply 56 is located is activated, and air from outside of the apparatus housing 10 flows from the first intake port 300 into the first duct 302 and is supplied to the power supply 56. The air passes through the power supply 56 and reaches the first exhaust port 301 through the first duct 302 along with the heat of the power supply 56 and is exhausted from the first exhaust port 301 to the outside of the apparatus housing 10. Thus, the heat of the power supply 56 is exhausted to the outside of the apparatus housing 10.

The reagent cooling process T1 and the heat exhaust processes T2 and T3 may be initiated simultaneously or at different times.

After the reagent cooling process T1 and the heat exhaust processes T2 and T3 are started as illustrated in FIG. 20, the transferring process of a reaction container S2 is performed. In the transferring process of a reaction container S2, first, the container holder 261 of the dispensing apparatus 250 illustrated in FIG. 2 moves from an initial position above the container rack 91 of the reaction container storage 51 and then lowers to hold the empty reaction container 90 in the container rack 91.

Next, the container holder 261 of the dispensing apparatus 250 moves above the heater 160 and then lowers, and the reaction container 90 is held in the holding hole 180 of the heater 160. Then, the container holder 261 rises.

Then, the dispensing process of a sample S3 (illustrated in FIG. 20) is performed. First, the pipette 260 of the dispensing apparatus 250 illustrated in FIG. 2 moves above the sample rack storage 50 and lowers. The pipette 260 is inserted into a sample container of a sample rack in the sample rack storage 50 through the hole 81 in the top surface 80 and aspirates a sample.

Then, the pipette 260 rises above the sample rack storage 50 and moves above the heater 160. The pipette 260 lowers toward the reaction container 90 in the heater 160 and injects a sample into the reaction container 90.

Next, the pipette 260 rises above the heater 160 and moves above the cleaner 54. The pipette 260 lowers toward the cleaning tank 200 of the cleaner 54, is inserted into the cleaning tank 200, and is cleaned. Finally, the pipette 260 rises above the cleaner 54.

Next, the dispensing process of a reagent S4 is performed (illustrated in FIG. First, the pipette 260 of the dispensing apparatus 250 illustrated in FIG. 2 moves above the housing 110 of the reagent container storage 52. Then, the pipette 260 lowers and enters the housing 110 through the hole 121 in the top part 120. The pipette 260 is further inserted into the reagent container 100 of the reagent container rack 101 and aspirates a reagent from the reagent container 100.

Next, the pipette 260 rises above the reagent container storage 52, and while heating the reagent, moves above the heater 160.

Next, the container holder 261 of the dispensing apparatus 250 lowers toward the reaction container 90 in the heater 160 and holds the reaction container 90 in the heater 160.

Next, as illustrated in FIG. 15, while the container holder 261 rises above the heater 160, the pipette 260 lowers and is inserted into the reaction container 90. Then, the pipette 260 injects a reagent into the reaction container 90 of the container holder 261. Next, the reaction container 90 of the container holder 261 is vibrated, and a sample containing the reagent is agitated.

Next, the container holder 261 illustrated in FIG. 2 moves above the detector 161 and lowers. The container holder 261 lowers toward the holding hole 190 of the detector 161 and makes the holding hole 190 hold the reaction container 90. Finally, the container holder 261 rises above the detector 161.

Next, the measuring process S5 (illustrated in FIG. 20) is performed. In the detector 161, a blood coagulation measurement is performed to analyze an activity of a coagulation factor of a sample in the reaction container 90. As illustrated in FIG. 12, in the detector 161, with a state in which the reaction container 90 is adjusted to a predetermined temperature by the temperature controller 193, the irradiation section 194 irradiates light to a sample in the reaction container 90, and the light transmitted through the sample is received by the light receiving section 195 to detect measurement data concerning the sample.

Finally, the collecting and disposal process of the reaction container S6 (illustrated in FIG. 20) is performed. First, the container holder 261 of the dispensing apparatus 250 illustrated in FIG. 2 moves above the detector 161 and lowers. Next, the container holder 261 holds the reaction container 90 in the detector 161.

Next, the container holder 261 rises above the detector 161 and moves above the disposal section 55. The container holder 261 lowers toward the disposal port 210 of the disposal section 55 and disposes the reaction container 90 in the disposal port 210. Finally, the container holder 261 rises above the disposal section 55 and is then returned to its initial position.

According to the present embodiment, the power supply 56 is located in the apparatus housing 10 in the area different from the measuring unit 53 in a plan view and is located at a higher position than the measuring unit 53. In this way, the power supply 56 and the measuring unit 53 are separated. In addition, since warm air is at a position, which tends to be transmitted upward, where the power supply 56 is in the different area from the measuring unit 53 in a plan view, and is higher than the measuring unit 53, heat generated in the power supply 56 is less likely to be transmitted to the measuring unit 53. Therefore, the heat generated in the power supply 56 can be suppressed from affecting the temperature of a sample in the measuring unit 53. As a result, the sample temperature at the time of measurement in the measuring unit 53 is stabilized, and a measurement accuracy of a sample is improved. In particular, in a special environment with high temperature, heat from the power supply 56 tends to stay in the apparatus housing 10, but according to one or more embodiments, an effect on the sample temperature in the measuring unit 53 can be suppressed, and sample measurement in the special environment can be performed appropriately.

Since there is the vertical plate 70 as a partition member between the main region R1 where the measuring unit 53 is located and the rear region R2 where the power supply 56 is located, heat transfer from the power supply 56 to a sample in the measuring unit 53 can be more fully suppressed. In addition, since heat transfer of the power supply 56 to the top surface 24 of the main region R1 where the measuring unit 53 is located is suppressed, an electronic apparatus, such as the monitor 40, a PC, etc., can be placed on the top surface 24, which improves convenience.

The rear region R2 with the power supply 56 is located on a side part of the rear surface 21 side of the apparatus housing 10. In this way, an area of the top surface 24 of the main region R1, which is not affected by the heat of the power supply 56, can be sufficiently ensured.

Since the sample measuring apparatus 1 is provided with the first heat exhaust section 59 that exhausts heat from the power supply 56 to the outside of the apparatus housing 10, heat from the power supply 56 can be more fully suppressed from being transferred to the measuring unit 53.

The first heat exhaust section 59 has the first intake port 300 that takes in air from outside of the apparatus housing 10 to the rear region R2 where the power supply 56 is located, the first exhaust port 301 that exhausts air from the rear region R2 where the power supply 56 is located to the outside of the apparatus housing 10, and the first fan 303 that flows air from the first intake port 300 to the first exhaust port 301. In this way, the heat of the power supply 56 can be properly exhausted to the outside of the apparatus housing 10.

Since the first exhaust port 301 is located at a higher position than the first intake port 300, the heat of the power supply 56 can be effectively exhausted by taking advantage of a tendency of warm air to be transmitted upward.

Since the first heat exhaust section 59 has the first duct 302 that leads from the first intake port 300 to the power supply 56 and from the power supply 56 to the first exhaust port 301, air can be efficiently supplied to the power supply 56 and heat from the power supply 56 can be effectively exhausted.

Since the sample measuring apparatus 1 is provided with the second heat exhaust section 60 that exhausts heat generated by the Peltier element 150, which is a heat generating section of the reagent container storage 52, to the outside of the apparatus housing 10, heat generated by cooling the reagent container storage 52 can be suppressed from affecting the sample temperature in the measuring unit 53.

The second heat exhaust section 60 has the second intake port 350 that takes in air from outside of the apparatus housing 10 to the area with the heat sink 151, the second exhaust port 351 that exhausts air from the area with the heat sink 151 to the outside of the apparatus housing 10, and the second fan 353 that flows air from the second intake port 350 to the second exhaust port 351. In this way, heat generated in the reagent container storage 52 can be properly exhausted to the outside of the apparatus housing 10.

Since the second heat exhaust section 60 has the second duct 352 that leads from the second intake port 350 to the area with the heat sink 151 and from the area with the heat sink 151 to the second exhaust port 351, air can be efficiently supplied to the heat sink 151, and heat radiation from the heat sink 151 can be effectively performed.

The first heat exhaust section 59 and the second heat exhaust section 60 are provided on different sides of the apparatus housing 10. In this way, exhaust directions of the first exhaust port 301 and the second exhaust port 351 are different, so that it is possible to prevent heat from concentrating near some of the sides of the apparatus housing 10. As a result, each of the heat exhaust sections 59, 60 is prevented from being affected by heat that is already exhausted, and high heat exhaust efficiency is ensured in each of the heat exhaust sections 59, 60. By providing the first heat exhaust section 59 and the second heat exhaust section 60 on sides of the apparatus housing 10 rather than on the top and bottom surfaces of the apparatus housing 10, a dimension of the vertical direction of the apparatus housing 10 can be reduced. In addition, the top surface 24 of the apparatus housing 10 can be effectively utilized.

In a plan view, the heat exhaust directions of the first heat exhaust section 59 and the second heat exhaust section 60 are 90 degrees different, so that each of the heat exhaust sections 59, 60 is suppressed from being affected by heat exhausted from other heat exhaust sections, and high heat exhaust efficiency is ensured in each of the heat exhaust sections 59, 60.

In a plan view, the measuring unit 53 is located in an area within the apparatus housing 10 on one side of the imaginary straight line L1 that passes through the center of the apparatus housing 10 in the left/right direction X and extends in the front/rear direction Y, and the power supply 56 is located in an area within the apparatus housing on the other side of the imaginary straight line L1. In this way, the power supply 56 and the measuring unit 53 can be sufficiently separated, and an effect of heat from the power supply 56 on the measuring unit 53 can be suppressed.

The measuring unit 53 has the temperature controller 193 that adjusts the temperature of the reaction container 90. The accuracy of a sample measurement in such measuring unit 53 is greatly affected by temperature. Since the measuring unit 53 is not easily affected by heat from the power supply 56, a temperature adjustment of the reaction container 90 by the temperature controller 193 can be strictly performed, thereby improving the accuracy of a sample measurement.

The measuring unit 53 has the irradiation section 194 that irradiates light into the reaction container 90 and the light receiving section 195 that receives light transmitted through the reaction container 90. The accuracy of a sample measurement using such light is greatly affected by temperature. The measuring unit 53 is not easily affected by the heat of the power supply 56, thereby improving the accuracy of a sample measurement by this.

In the above embodiments, there may be an insulator between the rear region R2 where the power supply 56 is located and the main region R1 where the measuring unit 53 is located. In this case, for example, the vertical plate 70 may be an insulator. Also, the vertical plate 70 may have a non-insulation layer and an insulation layer. Furthermore, a different insulation plate from the vertical plate 70 may be provided.

Figure 21:
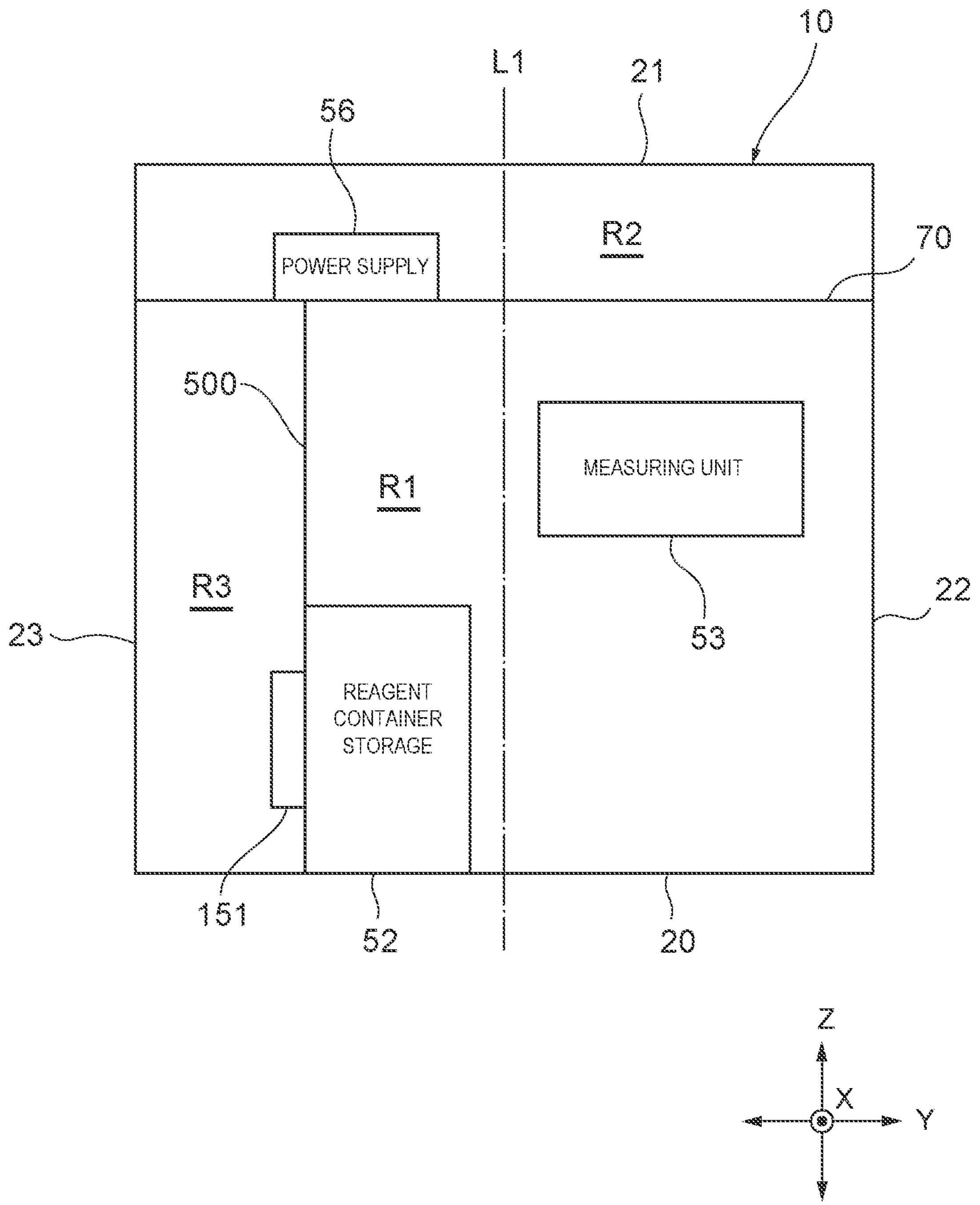
FIG. 21 is a schematic diagram illustrating the positional relationship between the measuring unit and the power supply viewing the apparatus housing from the top side in case that a second vertical plate is provided.

As illustrated in FIG. 21, a second vertical plate 500 may be provided as a partition member to isolate the area where the heat of the Peltier element 150, which is the heat generating section of the reagent container storage 52, is radiated (the area with the heat sink 151 as the heat radiator), from the main region R1 where the measuring unit 53 is located. The second vertical plate 500 is provided near the left side surface 23 of the apparatus housing 10 so that a plate surface faces the left/right direction X. The second vertical plate 500 is formed from the front surface 20 until hitting the vertical plate 70 in a plan view. In this case, the area where the heat of the Peltier element 150 is radiated is a side region R3, which is partitioned against the main region R1 where the measuring unit 53 is located and the rear region R2 where the power supply 56 is located.

Figure 22:
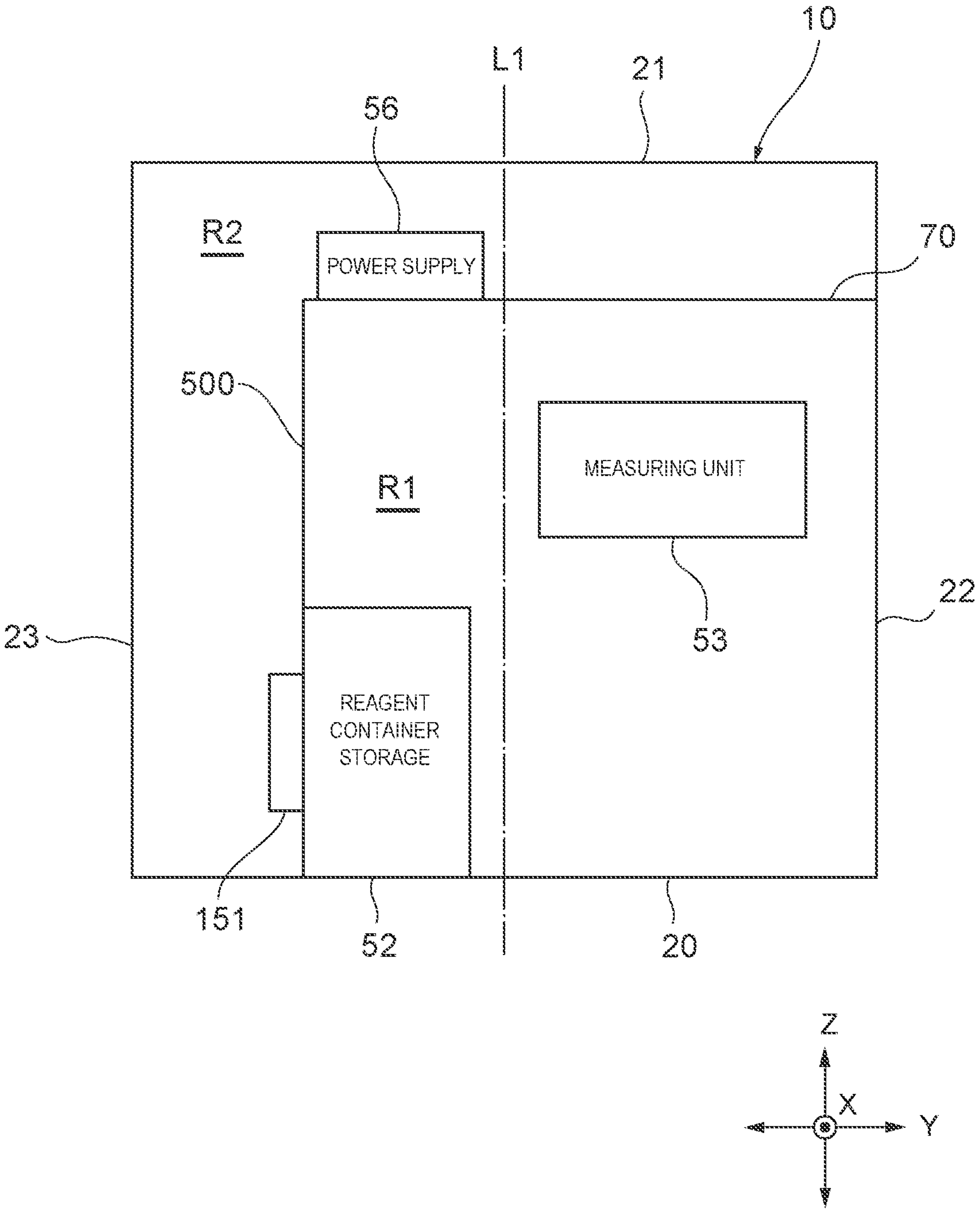
FIG. 22 is a schematic diagram illustrating the positional relationship between the measuring unit and the power supply viewing the apparatus housing from the top side in case that an area with the power supply and an area with a heat sink are connected.

As illustrated in FIG. 22, the area where the heat of the Peltier element 150 is radiated (the area with the heat sink 151 as the heat radiator) and the area with the power supply 56 may be the same region R2 connected to each other without being partitioned by the vertical plates 70, 500.

Figure 23:
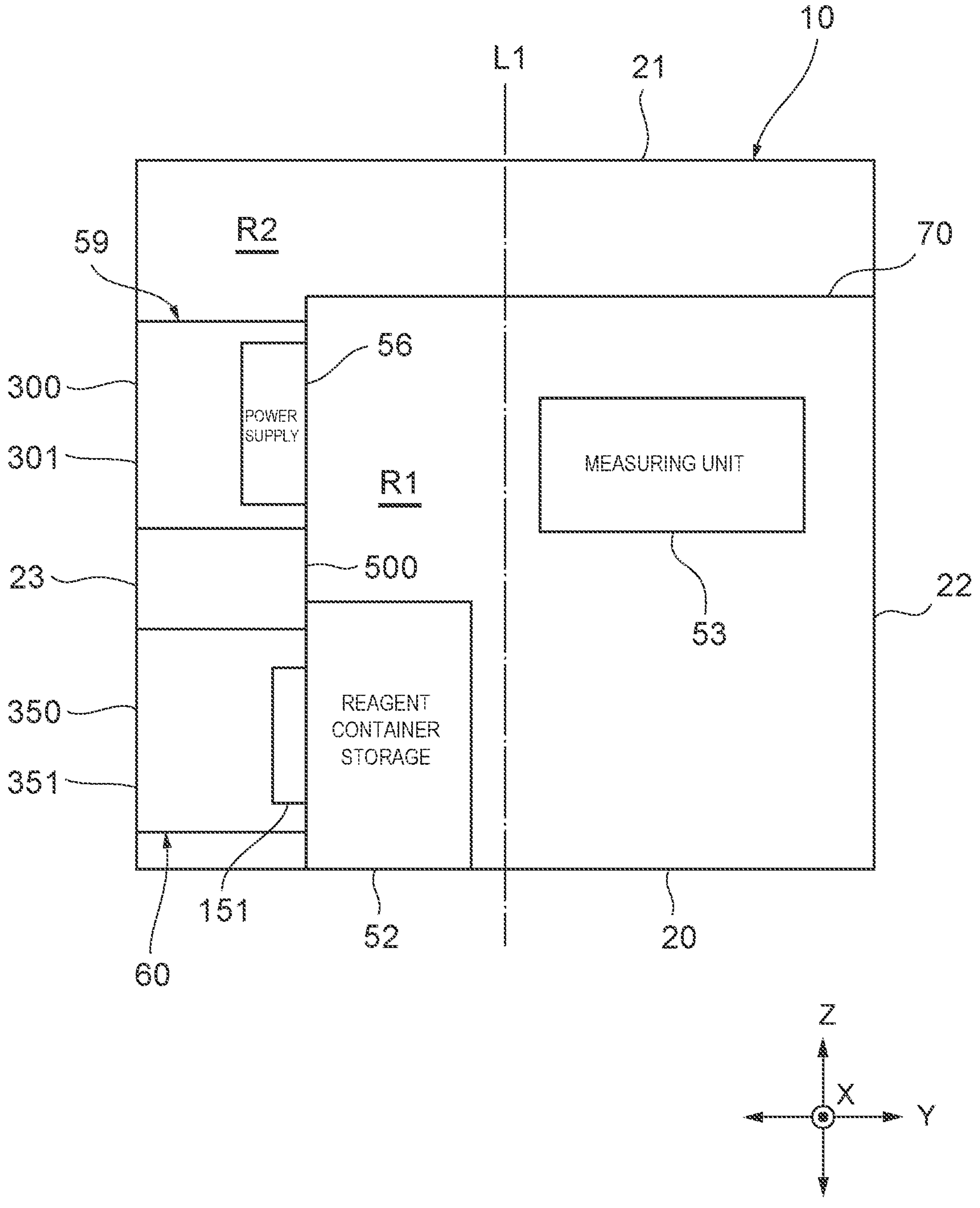
FIG. 23 is a schematic diagram illustrating the positional relationship between the measuring unit and the power supply viewing the apparatus housing from the top side in case that the power supply is provided on a left side surface side of the apparatus housing.

As illustrated in FIG. 23, the power supply 56 may be provided in the region R2, which is provided on the side of the left side surface 23 side of the apparatus housing and is different from the main region R1. The power supply 56 may be mounted on the second vertical plate 500. In such a case, the first intake port 300 and the first exhaust port 301 of the first heat exhaust section 59 are provided on the left side surface 23 of the apparatus housing 10 same as the second intake port 350 and the second exhaust port 351.

The above description of suitable embodiments is given with reference to the accompanying drawings, but the scope is not limited to such examples. It is clear that a person skilled in the art can conceive of various examples of changes or modifications within the scope of the ideas described in the claims, which are naturally understood to be within the technical scope.

The sample measuring apparatus 1 described in the above embodiments may have other configurations. Configurations of the reagent container storage 52, the measuring unit 53, the power supply 56, the first heat exhaust section 59, the second heat exhaust section 60, etc. may also have other configurations.

In the above embodiments, a partition member that divides the area where the power supply 56 is located and the area where the measuring unit 53 is located is the vertical plate 70, but it may have other configurations other than the vertical plate 70. Also, the power supply 56 and the measuring unit 53 can be in different areas that do not overlap each other in a plan view, even without a partition member.

The sample measuring apparatus according to one or more embodiments may be applied to a sample measurement other than a blood coagulation measurement, a blood immunoassay, a blood cell count measurement, a biochemical analysis, a urine analysis, etc.

A sample measuring apparatus according to one or more embodiments may suppress heat generated in a power supply from affecting the temperature of a sample in a measuring unit.

As a supplemental notes, a sample measuring apparatus according to one or more embodiments are summarized.

A sample measuring apparatus comprising:

a measuring unit that measures a sample in a container;

a power supply that supplies power to the measuring unit; and an apparatus housing that accommodates the measuring unit and the power supply inside, wherein the power supply is arranged in an area in the apparatus housing, the area that is the power supply is arranged is different from an area that the measuring unit is arranged in a plan view, and the power supply is arranged at a higher position than a position that the measuring unit is arranged.

In the sample measuring apparatus, the sample measuring apparatus further comprises an insulator that is arranged between an area with the power supply and an area with the measuring unit.

In the sample measuring apparatus, the sample measuring apparatus further comprises a partition member that is arranged between an area with the power supply and an area with the measuring unit.

In the sample measuring apparatus, the partition member comprises a vertical plate that is erected in a vertical direction.

In the sample measuring apparatus, the power supply is arranged at a higher position than a center of the apparatus housing in a vertical direction.

In the sample measuring apparatus, the area with the power supply is arranged on a side of the apparatus housing.

In the sample measuring apparatus, the sample measuring apparatus further comprises a first heat exhaust section that exhausts heat from the power supply to outside of the apparatus housing.

In the sample measuring apparatus, the first heat exhaust section comprises:

a first intake port that takes in air from outside of the apparatus housing to the area with the power supply;

a first exhaust port that exhausts air from the area with the power supply to the outside of the apparatus housing; and a first fan that flows air from the first intake port to the first exhaust port.

In the sample measuring apparatus, the first exhaust port is arranged at a higher position than the first intake port.

In the sample measuring apparatus, the first heat exhaust section further comprises a first duct that leads from the first intake port to the power supply and from the power supply to the first exhaust port.

In the sample measuring apparatus, the sample measuring apparatus further comprises:

a reagent container storage that stores a reagent container containing a reagent to be mixed with a sample;

a heat generating section that generates heat in case that a reagent contained in the reagent container in the reagent container storage is cooled; and a second heat exhaust section that exhausts heat generated in the heat generating section to the outside of the apparatus housing.

In the sample measuring apparatus, the second heat exhaust section comprises:

a second intake port that takes in air from outside of the apparatus housing into an area where heat of the heat generating section is radiated;

a second exhaust port that exhausts heat from an area where heat of the heat generating section is radiated to the outside of the apparatus housing; and a second fan that flows air from the second intake port to the second exhaust port.

In the sample measuring apparatus, the second heat exhaust section further comprises a second duct that leads from the second intake port to an area where heat of the heat generating section is radiated and from the area to the second exhaust port.

In the sample measuring apparatus, the first heat exhaust section and the second heat exhaust section are arranged on different sides of the apparatus housing.

In the sample measuring apparatus, in a plan view, heat exhaust direction of the first heat exhaust section has 90 degrees angle with a heat exhaust direction of the second heat exhaust section.

In the sample measuring apparatus, in a plan view, the measuring unit is arranged in an area within the apparatus housing on one side of an imaginary straight line that passes through a center of a first direction of the apparatus housing and extends in a second direction perpendicular to the first direction, and the power supply is arranged in an area within the apparatus housing on the other side of the imaginary straight line.

In the sample measuring apparatus, the measuring unit comprises a temperature controller that controls temperature of a container.

In the sample measuring apparatus, the measuring unit comprises:

an irradiation section that irradiates light to the container; and a light receiving section that receives light transmitted through the container.

The invention claimed is:

1. A sample measuring apparatus comprising:

a measuring unit configured to measure a sample in a container;

a power supply configured to supply power to the measuring unit; and an apparatus housing which accommodates the measuring unit and the power supply inside, wherein the power supply is arranged in an area in the apparatus housing, the area in which the power supply is arranged is different from an area in which the measuring unit is arranged in a plan view, and the power supply is arranged at a higher position than a position in which the measuring unit is arranged, wherein the sample measuring apparatus further comprises:

a first heat exhaust section configured to exhaust heat from the power supply towards an outside of the apparatus housing;

a reagent container storage configured to store a reagent container containing a reagent to be mixed with a sample;

a heat generating section configured to generate heat as a result of heat exchange for cooling the reagent contained in the reagent container stored in the reagent container storage; and a second heat exhaust section configured to exhaust heat generated in the heat generating section towards the outside of the apparatus housing.

2. The sample measuring apparatus according to claim 1, further comprising:

an insulator that is arranged between an area with the power supply and an area in which the power supply is arranged and an area in which the measuring unit is arranged.

3. The sample measuring apparatus according to claim 1, further comprising:

a partition member that is arranged between an area in which the power supply is arranged and an area in which the measuring unit is arranged.

4. The sample measuring apparatus according to claim 3, wherein the partition member comprises a vertical plate that is erected in a vertical direction.

5. The sample measuring apparatus according to claim 1, wherein the power supply is arranged at a higher position than a center of the apparatus housing in a vertical direction.

6. The sample measuring apparatus according to claim 1, wherein the area with the power supply is arranged on a side of the apparatus housing.

7. The sample measuring apparatus according to claim 1, wherein the first heat exhaust section comprises:

a first intake port that takes in air from outside of the apparatus housing to the area with the power supply;

a first exhaust port that exhausts air from the area with the power supply to the outside of the apparatus housing; and a first fan that flows air from the first intake port to the first exhaust port.

8. The sample measuring apparatus according to claim 7, wherein the first exhaust port is arranged at a higher position than the first intake port.

9. The sample measuring apparatus according to claim 7, wherein the first heat exhaust section further comprises a first duct that leads from the first intake port to the power supply and from the power supply to the first exhaust port.

10. The sample measuring apparatus according to claim 1, wherein the second heat exhaust section comprises:

a second intake port that takes in air from outside of the apparatus housing into an area where heat of the heat generating section is radiated;

a second exhaust port that exhausts heat from an area where heat of the heat generating section is radiated to the outside of the apparatus housing; and a second fan that flows air from the second intake port to the second exhaust port.

11. The sample measuring apparatus according to claim 10, wherein the second heat exhaust section further comprises a second duct that leads from the second intake port to an area where heat of the heat generating section is radiated and from the area to the second exhaust port.

12. The sample measuring apparatus according to claim 1, wherein the first heat exhaust section and the second heat exhaust section are arranged on different sides that the apparatus housing has.

13. The sample measuring apparatus according to claim 12, wherein in a plan view, a heat exhaust direction of the first heat exhaust section has 90 degrees angle with a heat exhaust direction of the second heat exhaust section.

14. The sample measuring apparatus according to claim 1, wherein in a plan view, the measuring unit is arranged in an area within the apparatus housing on one side of an imaginary straight line that passes through a center of a first direction of the apparatus housing and extends in a second direction perpendicular to the first direction, and the power supply is arranged in an area within the apparatus housing on the other side of the imaginary straight line.

15. The sample measuring apparatus according to claim 1, wherein the measuring unit comprises a temperature controller that controls temperature of a container.

16. The sample measuring apparatus according to claim 15, wherein the measuring unit comprises:

an irradiation section that irradiates light to the container; and a light receiving section that receives light transmitted through the container.

* * * * *